United States Patent [19]

Smith et al.

[11] Patent Number: 4,602,275
[45] Date of Patent: Jul. 22, 1986

[54] TELEVISION MEMORY SYSTEM

[75] Inventors: Terrence R. Smith, Haddon Township, Camden County; Allen L. Limberg, Hopewell Township, Mercer County, both of N.J.

[73] Assignee: RCA Corporation, Princeton, N.J.

[21] Appl. No.: 590,989

[22] Filed: Mar. 19, 1984

[51] Int. Cl.[4] .................. H04N 11/20; H04N 9/64
[52] U.S. Cl. ................................ 358/11; 358/21 R
[58] Field of Search .................. 358/11, 12, 13, 21 R, 358/31

[56] References Cited

U.S. PATENT DOCUMENTS

| | | | |
|---|---|---|---|
| 3,899,771 | 8/1975 | Saraga et al. | 382/21 |
| 3,956,737 | 5/1976 | Ball | 364/200 |
| 4,250,521 | 2/1981 | Wright | 358/21 R |
| 4,345,272 | 8/1982 | Shirota | 358/21 R |
| 4,375,638 | 3/1983 | O'Keefe et al. | 340/726 |
| 4,393,482 | 7/1983 | Yamada | 365/236 |
| 4,400,719 | 8/1983 | Powers | 358/21 R |
| 4,415,991 | 11/1983 | Chu et al. | 365/77 |
| 4,435,792 | 3/1984 | Bechtolsheim | 365/230 |
| 4,460,958 | 7/1984 | Christopher | 364/200 |
| 4,530,004 | 7/1985 | Achiha et al. | 358/12 |

FOREIGN PATENT DOCUMENTS 2059712A 4/1981 United Kingdom .
2090505A 12/1981 United Kingdom .

OTHER PUBLICATIONS

P. M. Kogge, Architecture of Pipelined Computers, McGraw-Hill Book Company, pp. 39-44.

Primary Examiner—John W. Shepperd
Attorney, Agent, or Firm—E. M. Whitacre; E. P. Herrmann; K. N. Nigon

[57] ABSTRACT

A memory system for a television receiver is disclosed. The memory system contains an array of addressable memory cells, each row of which can contain one line of sampled video signals. The number of rows in the array is greater than the number of lines in a frame. Apparatus is included in the memory system for simultaneously writing more than one line of samples into the memory, for simultaneously reading more than one line of samples from the memory, or for both. Simultaneous access to multiple lines allows the reading and writing of multiple corresponding lines of samples from both the current and the prior frame. The row addresses that are used to store the lines of samples for a frame are not the same for each frame, rather the lines of each new frame are stored in rows with lesser addresses than the rows used for the prior frame. This introduces a backward scrolling of the stored image from frame to frame which avoids overwriting data to be used in time-domain or spatial-domain filtering done directly from memory.

18 Claims, 19 Drawing Figures

TELEVISION MEMORY SYSTEM

The present invention relates generally to television memory systems and specifically to such systems as are useful for storing and transversally filtering raster scanned video signals.

Field store or frame store memories can be used advantageously to store fields or frames of video signal samples for use in freeze action display. Such memories can also be used to store supplied samples of line interlaced video signals for subsequent use in supporting a progressive scan display. For such a display, the raster scans the entire frame line by line rather than alternate line by alternate line in each of two fields as for an interlaced scan display. Loss of vertical resolution is less of a problem with a progressive scan image than with an interlaced scan image since improper line interlace is not likely to be a problem and since the display of a full frame reduces the visibility of the raster scan. If the progressive scan frames are displayed at the same rate as the interlaced scan fields, moreover, the amount of field rate flicker in the image will be reduced.

When a field store or frame store memory is used to hold composite video signals that contain color as well as brightness information, it is a common practice to channel the samples provided by the memory through a line comb filter or a frame comb filter to extract separate color and brightness information signals. One or more scan lines of delay are used in finite impulse response (FIR) filters of this type. These delays are usually provided by additional memory.

Field or frame stores can also be used to provide samples for other types of transversal filters, for example, a low pass filter used in a surveillance system or a high pass filter used in an edge detection system. Further memory, in the form of an additional field or frame store or of a set of delay lines, usually provides the delay for these types of filters as well.

This extra memory is used because conventional field store or frame store memories have been designed without much consideration of memory design conventions carried over from the computer industry. Three of these conventions deserve more thought: the limitation of one input to the memory, the limitation of one output from the memory and the limitation of an invariant relationship between memory addresses and display data.

Much or all of the need for auxillary memory elements for use with a field or frame store can be eliminated by avoiding the latter and one or both of the former of these limiting conventions.

As an example, an adaptive comb filter may require sequential lines from the current field as well as lines from the previous frame. A properly designed frame store can provide all of these.

SUMMARY OF THE INVENTION

The present invention is a video signal memory system having multiple inputs and multiple outputs and simultaneously containing data from each of two fields or two frames.

The memory system includes an array of memory storage locations, a memory controller and an address generator. The memory array contains rows of storage locations that correspond to sampled horizontal lines of composite video signals. The rows are divided among $2^N$ memory modules with each row having a unique address. The N less significant bits of a row address indicate the memory module that contains the row. As an example, if there were 4 modules, rows 0, 4, and 8 may be in module 0, then rows 1, 5, and 9 are in module 1; rows 2, 6, and 10 in module 2; and rows 3, 7, and 11 in module 3. This technique of placing consecutively accessed items into N separate memory components with consecutively greater component numbers, modulo N, is known in the art as interleaving.

The memory controller takes one row address and converts it into N row addresses, one for each memory module. It also applies the input samples to appropriate modules for writing and channels the output samples from each module to an appropriate output of the memory system.

The memory controller arranges the read and write addresses such that successive frames scroll backward through memory. In other words, as each line of samples is written into memory it occupies a row one or more rows before the row that holds the analogous line from the previous frame. Conceptually, insofar as row addressing is concerned, the memory appears to be a cylinder of parallel rows where the last row address precedes the first. This conceptual model presumes the use of modular arithmetic in row addressing. The number of rows in the cylindrical memory is greater than the number of scan lines in a field or frame that contain image information; this causes the image to be continuously scrolled backward through memory. For example, assuming a 512 row memory and a 483 line frame, if a first frame were to occupy rows 2 through 484, the next frame could occupy rows 0 through 482; the third frame could occupy rows 510, 511 and 0 through 480; and the fourth could occupy rows 508 through 511 and rows 0 through 478. This process of rolling the image through memory is called scrolling.

The address generator produces row addresses and column addresses. A new column address is provided each time a new sample is received; a new row address, each time a received sample is from a new horizontal line. The row addresses increase in value until the last row in the memory is addressed and then restart at the address of the first row to implement the cylindrical conceptual model of memory row addressing.

The lines of samples appearing at the outputs of this memory are in a fixed spatial relationship with respect to each other. For example, in a four output memory, the first, second and third outputs may supply consecutive sampled lines from the current field and the fourth output may supply the sampled line from the prior frame that spatially corresponds to the second of the supplied lines from the current frame. The outputs of the memory system, therefore, are equivalent to variously delayed input signals. These may be applied to conventional transversal filters to obtain filtered video signals.

DETAILED DESCRIPTION

Figure 1:
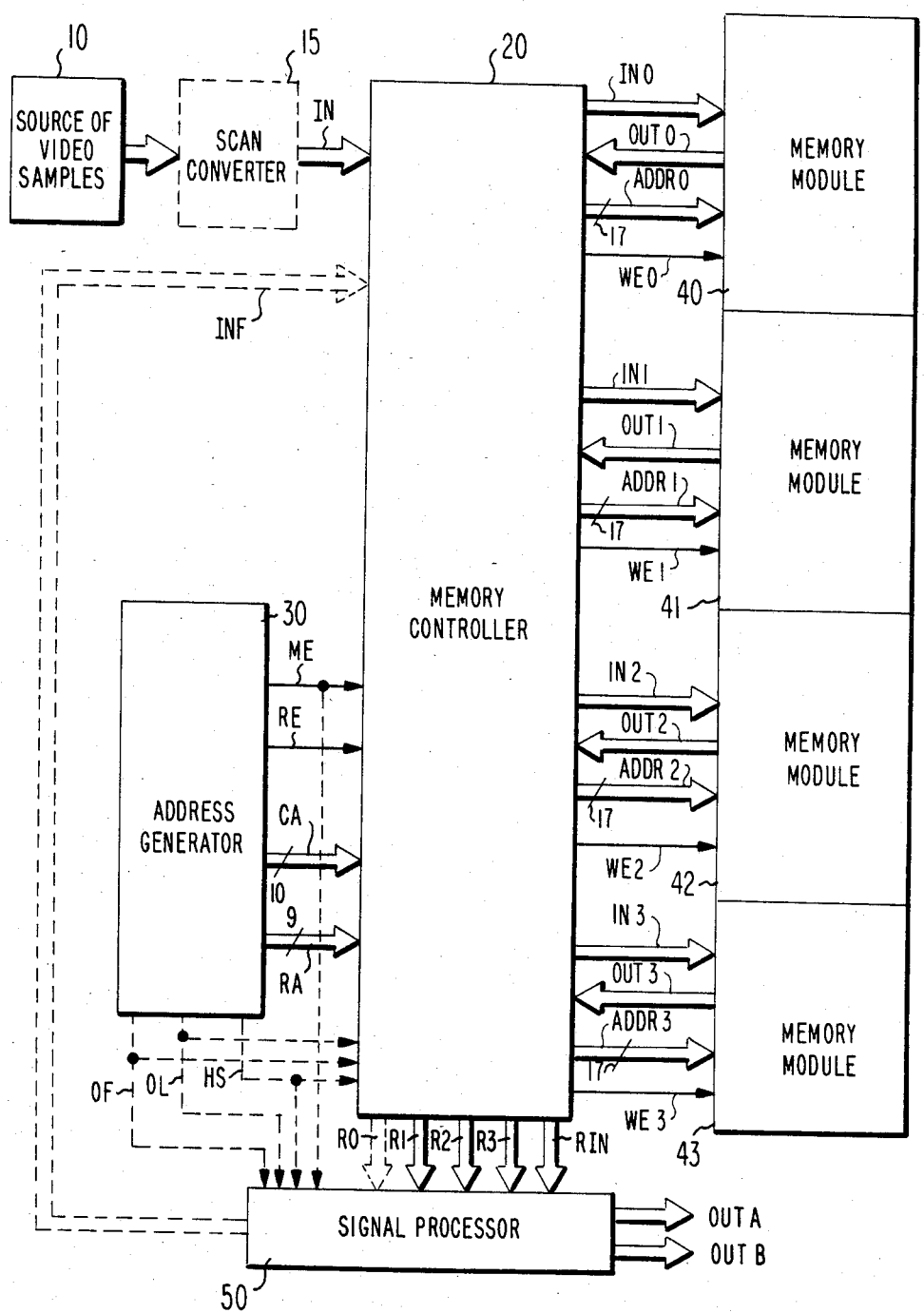
FIG. 1 is a block diagram of an illustrative embodiment of a television memory system suitable for use with an adaptive comb filter.

In the drawing, broad arrows represent signals in the form of parallel digital signal busses. These are eight bits wide unless otherwise indicated by a slash across the signal bus and an adjacent number. Single line arrows represent interconnections that may carry analog signals, digital levels, one bit or serial digital signals. A small circle at the input terminal of a logic element indicates that that element responds to the logical complement of that input signal. As used herein, higher numbered bits of a digital word or bus are more significant than lower numbered bits. Counters and flip-flops are operative on the positive going edges of signals unless stated otherwise.

To reduce confusion in referring to the lines, fields and frames that constitute an image, the following nomenclature is adopted for use in the descriptions that follow. A frame is composed of an even field and an odd field. The even field contains all of the even numbered lines in the frame; the odd field contains the odd numbered lines. In a given frame, the even field is supplied before the odd field unless otherwise stated. This last convention is not necessary and is used merely to simplify the explanation of the present invention.

The memory system shown in FIG. 1 is drawn in the context of an adaptive comb filter. The particular adaptive comb filter described uses three lines from the current field in a conventional line comb and one line from the current field and its corresponding line from the prior frame in a conventional frame comb. Details of the structure and operation of this filter are explained below in reference to FIG. 9.

The memory system receives discrete time samples from the source of video samples 10. Source 10 may be coupled to the video detector of a television receiver (not shown) and may include either a sample and hold circuit for providing discrete analog samples or an analog to digital converter for providing for example, pulse code modulated digital samples. The description that follows is in terms of digital samples and digital circuitry, though it is to be understood that the present invention is not limited to the processing of digital samples but also includes the processing of discrete time analog samples.

The samples from source 10 are applied via bus IN to the input of memory controller 20. The functions of scan converter 15 and of all signal busses and interconnections shown in phantom are explained below in the context of an alternative embodiment. The samples appearing at the input of controller 20 are applied to each of the memory modules 40 through 43 via busses IN0 through IN3 respectively. Input samples are also passed to signal processor 50 via bus RIN from memory controller 20.

The particular addresses used for writing samples into the memory are determined by address generator 30. Address generator 30 provides a nine bit row address, RA; a ten bit column address, CA; a memory enable signal, ME; and a row enable signal, RE, to controller 20. The ten bit column address can have $2^{10}$ or 1024 different values, a sufficient number to ensure a unique address for each of the 768 samples of the active portion of a video line in the NTSC system. Similarly, the 512 different possible values of the seven bit row address ensure unique address for the 483 active lines from one frame and up to 29 additional lines which may be active lines from another frame. The 19 bits of row and column address provided to controller 30 are processed into four separate 17 bit address codewords. These are applied by controller 20 to each of the memory modules 40 through 43 via busses ADDR0 through ADDR3 respectively. Controller 20 also generates a write enable signal for the module into which the input data is to be written. The write enable signals, developed from the row and column addresses, RA and CA and from the memory enable and row enable signals ME and RE, are applied to the memory modules via the interconnections WE0 through WE3.

Each module, whether data is written into it or not, has data read from it using the address codeword provided by controller 20 and address generator 30. Controller 20 accepts the data read from the memory modules 40 through 43 via memory module output busses OUT0 through OUT3 respectively. These data are then multiplexed by controller 20 onto different ones of the memory system output ports R1 thorugh R3. Each of the ports R1 through R3 carries data from a line that bears a fixed relationship to the line that is being filtered. The relationship between a particular memory module output bus and a memory system output port changes continuously as the raster scanned lines are processed.

In this illustrative embodiment, samples of the line to be filtered are presented at port R2, samples of the line before the line to be filtered at R1, and samples of the line from the prior frame that spatially corresponds to the line to be filtered at R3; output port R0 is not used in this embodiment. The line of samples at port RIN is the line after the line to be filtered.

Signal processor 50 accepts these lines of video samples, provides a filtered chrominance signal via port OUTA, and a filtered luminance signal via port OUTB. These filtered signals may then be subject to further processing, for example, by the luminance and chrominance processing circuits of a color television receiver (not shown).

Figure 2:
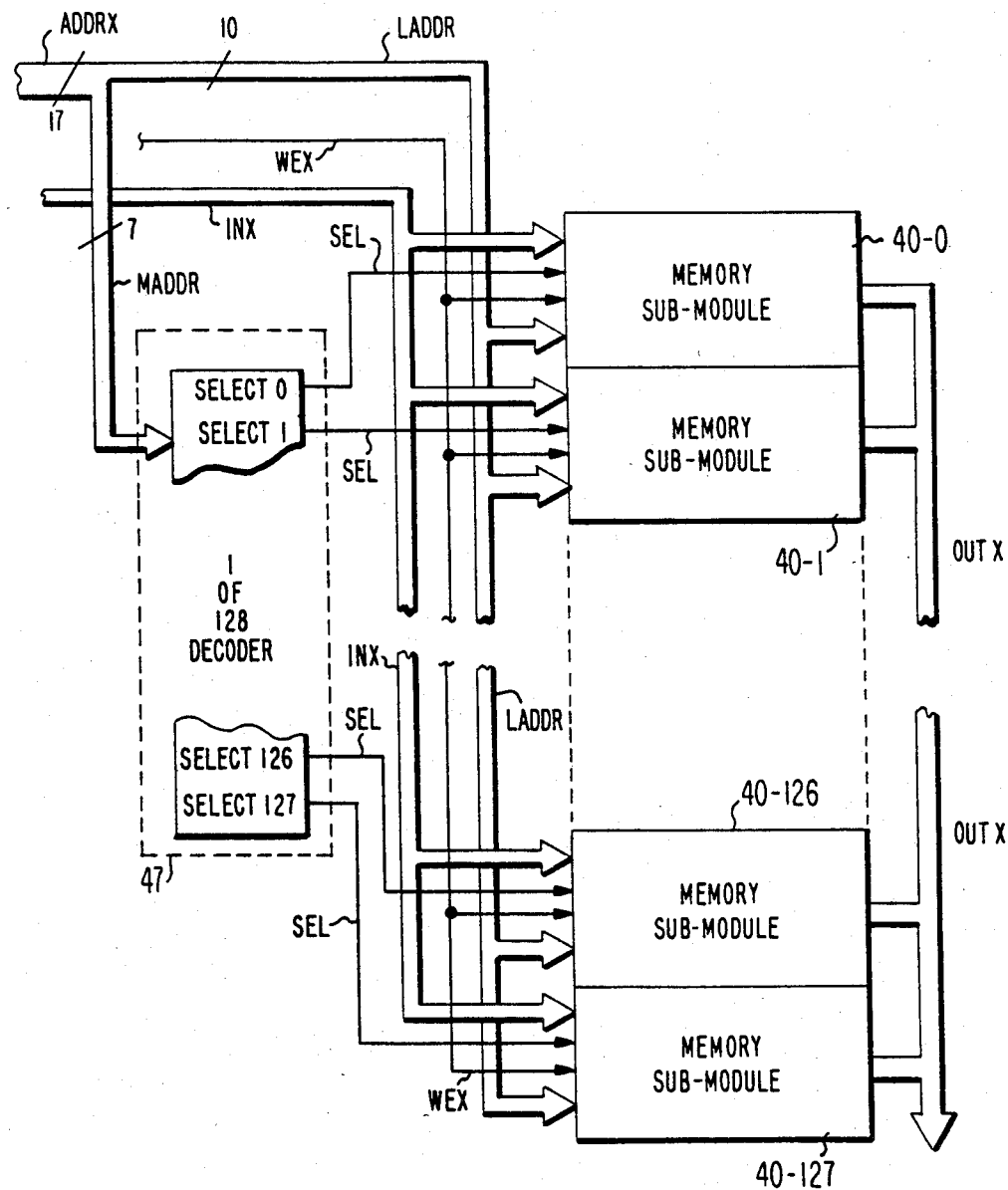
FIG. 2 is a block diagram of one of the memory modules used in the embodiment of FIG. 1.
Figure 3:
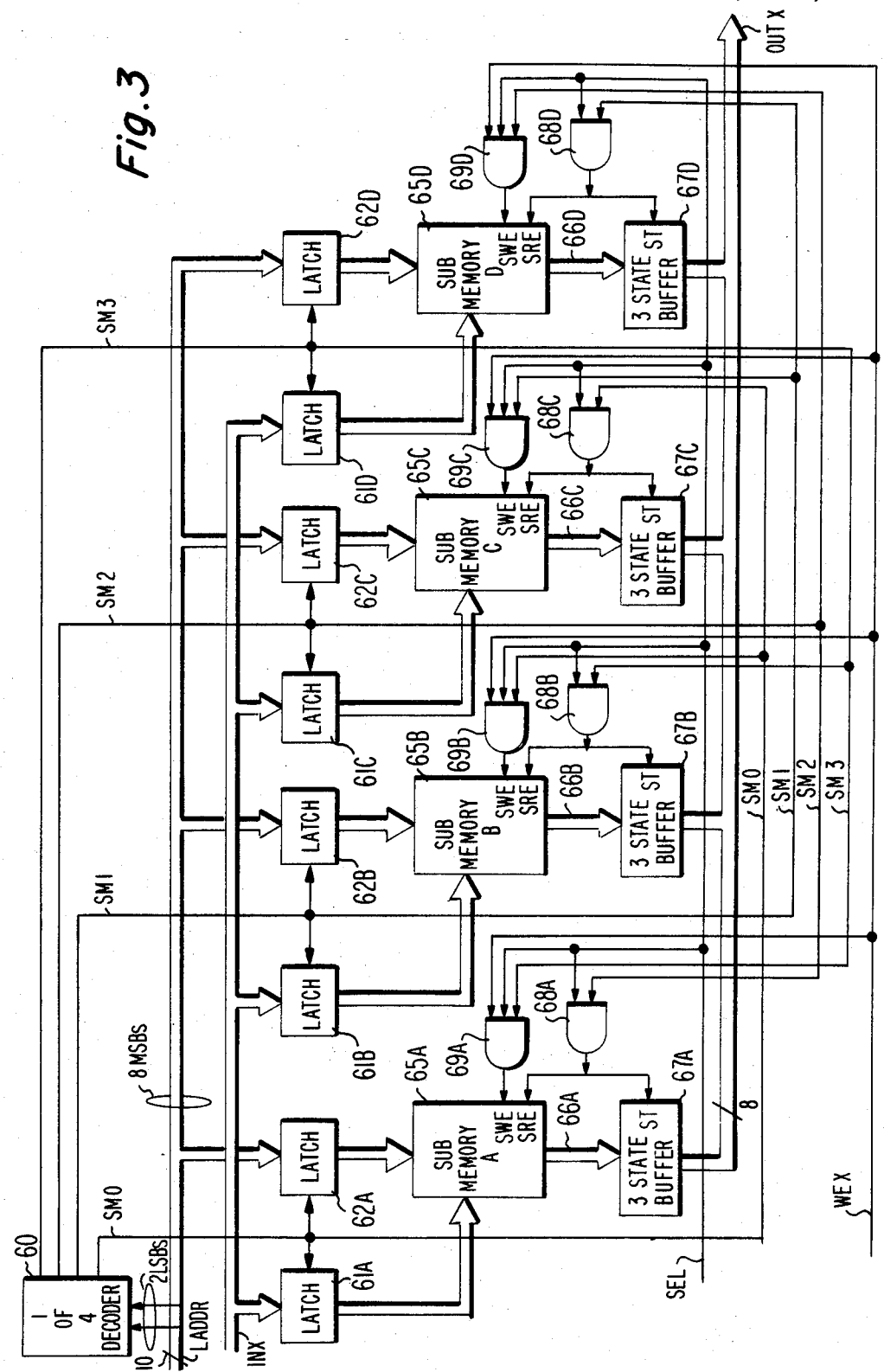
FIG. 3 is a block diagram of one of the memory submodules used in the memory module shown in FIG. 2.

FIGS. 2 and 3 show further details of one of the memory modules of FIG. 1. The block diagram in FIG. 2 shows the means by which individual lines of samples, stored in memory submodules, are combined to form a memory module. FIG. 3 shows details of a submodule.

The address codeword to be used to access the memory modules is applied to bus ADDRX, in FIG. 2, by the memory controller. This codeword is split onto two separate busses, the seven more significant bits (associated with memory row addressing) being applied via bus MADDR to 1 of 128 decoder 47 and the 10 less significant bits (associated with memory column addressing) being applied via bus LADDR to each of the 128 memory submodules 40-0 through 40-127. Each memory submodule also receives an input data signal, INX, and a write enable signal, WEX, from the memory controller.

Decoder 47, in response to the address codeword applied to its input produces a select signal for the particular submodule to be addressed and passes this signal to the submodule via an appropriate one of the select connections, SEL.

The output of the selected submodule appears on output bus OUTX which is common to all submodules.

FIG. 3 is a block diagram showing details of the structure of one memory submodule. One line of pixel samples is stored in each submodule. The samples are stored in an interleaved manner into the four submemories that are included in the submodule. As defined above, interleaving is the process by which consecutively accessed data items are placed into N separate memory components having consecutively greater component numbers, modulo N. For the storage of a line of pixels in a submodule, for example, if a first pixel were placed in submemory 65A, the second would be placed in submemory 65B, the third in 65C, the fourth in 65D, the fifth in 65A, and so on. The advantage gained from interleaving the addresses of the submemories is faster access to the data they contain. Because each submemory can be controlled separately, its read and write times can be made to overlap the read and write times of the other submemories. The equivalent cycle time of the entire memory module, therefore, can be reduced by appropriately phasing the read and write cycles of its submemories. For the memory module shown in FIG. 3, a fourfold decrease in memory cycle time can be achieved. This yields an equivalent cycle time of about 30 ns when commercially available semiconductor memories with cycle times of 120 ns are used for the submemories.

For simplicity of explanation, the structure including only one of the four submemories and its support circuitry is described below. This is sufficient to describe the entire submodule because of the replication of the structure in the submodule.

The ten bit address codeword developed in the memory module is applied to the submodule via bus LADDR. The two least significant bits of this address codeword are applied to one of four decoder 60, which develops enabling signals SM0 through SM3 for application to submemories 65A through 65D respectively. The eight most significant bits of the address codeword on bus LADDR are applied to latch 62A. At the same time, the data sample that corresponds to this address is applied to latch 61A. Latches 61A and 62A are loaded when an enabling signal SM0 goes to a high logic state.

The select signal SEL controls both the reading and writing of data in the submodule. SEL and SM2 are the input signals to AND gate 68A; its output terminal is connected to the read enable input terminal (SRE) of submemory 65A and to the strobe input terminal (ST) of three state buffer 67A. If the submodule is selected, the data stored in the cell addressed by latch 62A is read from submemory 65A onto bus 66A when signal SM2 goes to a logically high state. At the same time, three state buffer 67A is strobed by SM2, gating the data from bus 66A onto output bus OUTX.

The input signals to AND gate 69A are SEL, WEX and SM3. The output of gate 69A is connected to the write enable input terminal (SWE) of submemory 65A. If SEL and WE are in a high logic state, the data in latch 61A will be written into submemory 65A when the signal SM3 goes high. This data is written into the memory cell addressed by latch 62A.

Figure 4:
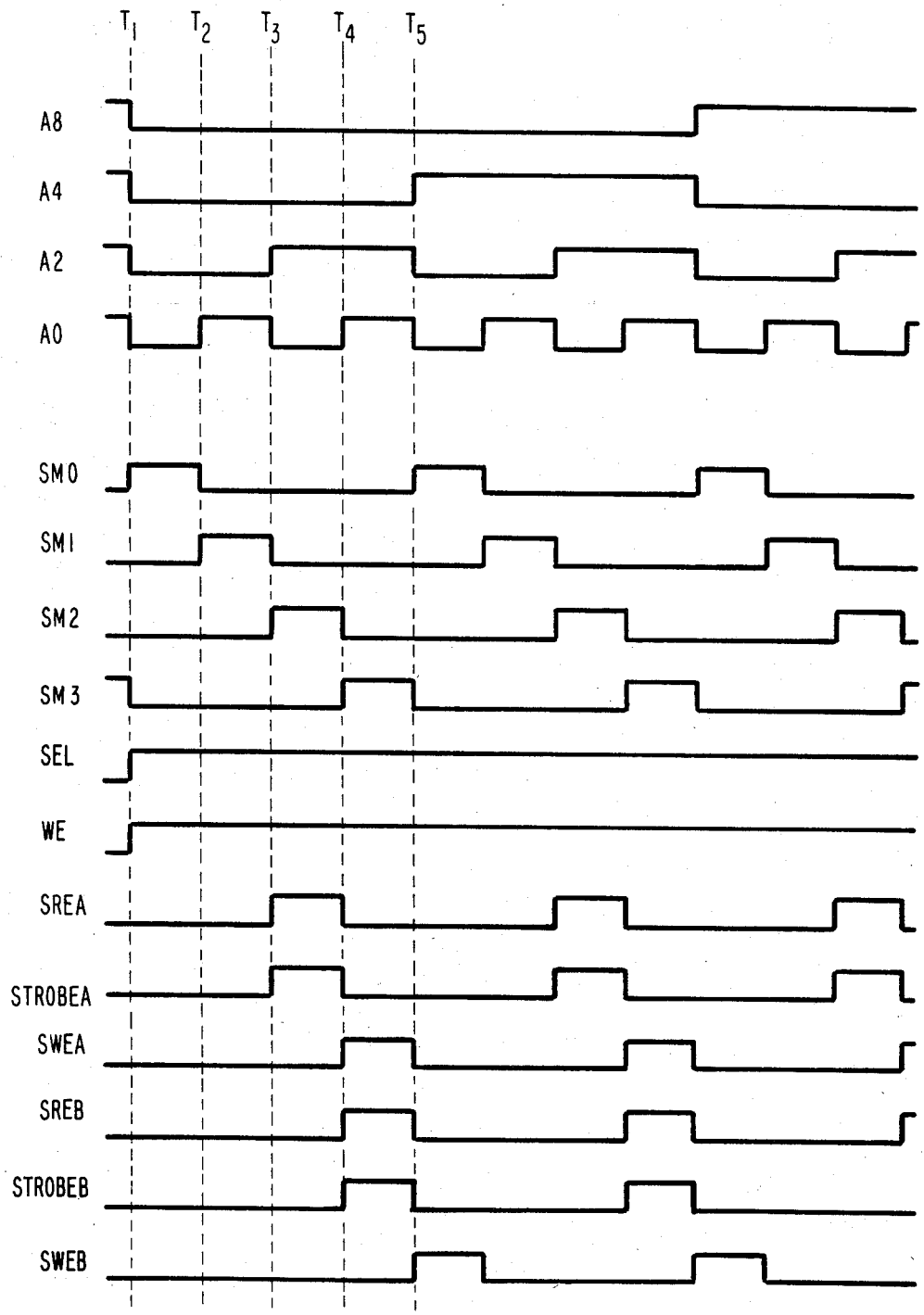
FIG. 4 is a timing diagram useful in explaining the operation of the memory submodule of FIG. 3.

Operational details of a submodule may be more easily understood with reference to the timing diagrams of FIG. 4. The four least significant bits of the address applied to bus LADDR are shown as signals A0, A2, A4 and A8. At each of the times T1 through T5, the address has a different, progressively increasing value.

At time T1, the two least significant bits of the address codeword are both in a low logic state so SM0 is high. This causes the then current data signal INX, and the current address signal, LADDR, to be loaded into latches 61A and 62A respectively. At time T2, SM0 goes low and SM1 goes high. This causes the next pixel datum and its address codeword to be loaded into latches 61B and 62B respectively. SM2 goes high at time T3 and SM1 goes low. The leading edge of the pulse on SM2 causes the third pixel and its address codeword to be loaded into latches 61C and 62C respectively. It also causes the data in submemory 65A addressed by latch 62A to be transferred through three state buffer 67A to the output bus OUTX. Signal SM3 goes high at time T4 causing the fourth pixel and its address codeword to be loaded into latches 61D and 62D respectively. Simultaneously, the data in submemory 65B that is addressed by latch 62B is transferred to output bus OUTX, and the data in latch 61A is stored in the cell of submemory 65A addressed by latch 62A. When SM0 goes high at time T5, the cycle begins to repeat. The fifth pixel is loaded into latch 61A and its address codeword into latch 62A. The data stored in latch 61B is written into the cell of submemory 65B addressed by latch 62B and the data in the cell of submemory 65C that is addressed by latch 62C is applied to output bus OUTX.

The above description assumes that the select (SEL) and write enable (WEX) signals are both logically high. If only the select signal is high, only the read operations occur. If the select signal is low, the submemories are neither read from nor written into.

The input and ouput signals of the various memory modules are channeled through the memory controller. This controller also converts the address and control signals provided to it by the address generator into address and control signals for each of the memory modules.

Figure 5:
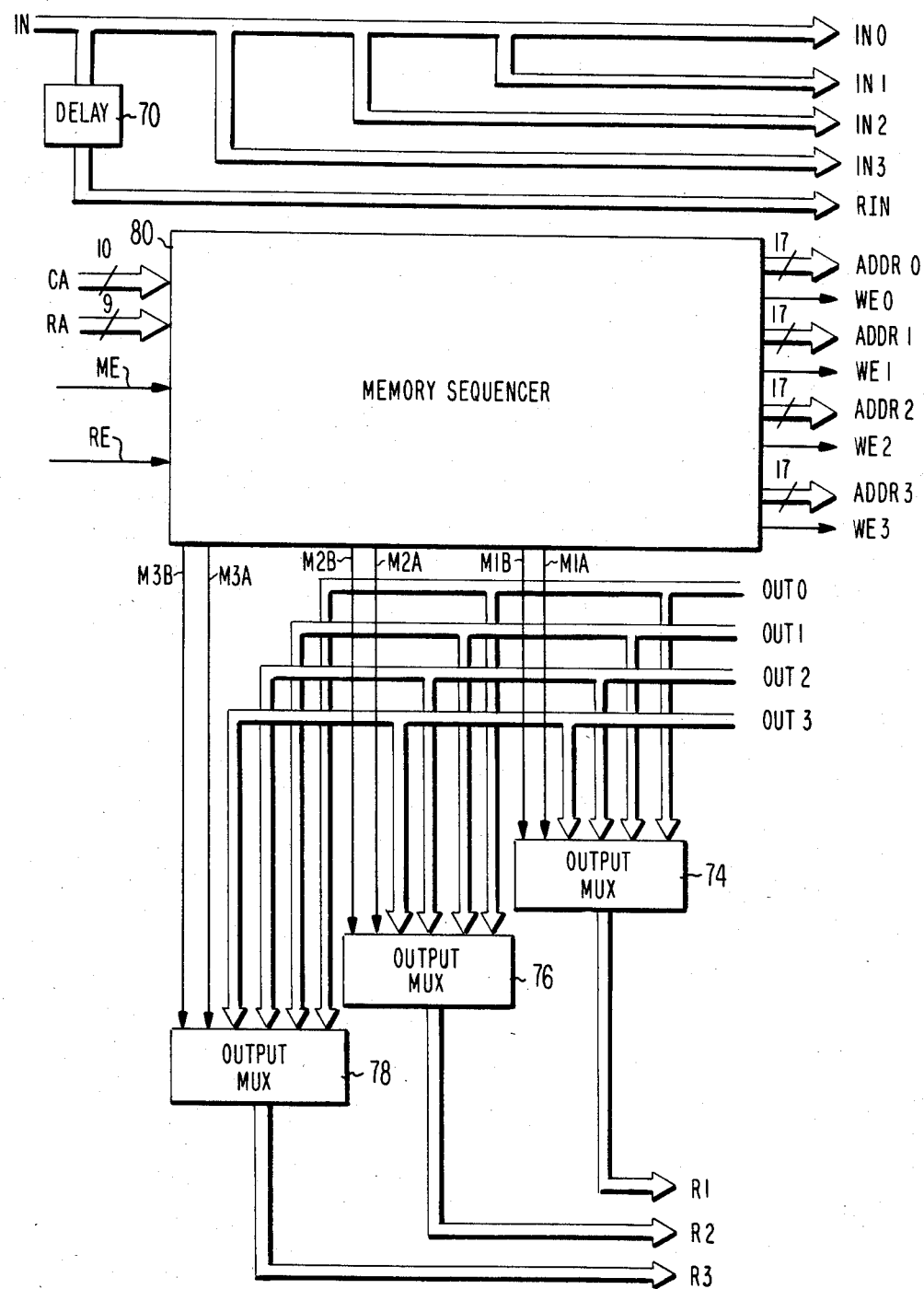
FIG. 5 is a block diagram of a memory controller suitable for use in the emboidment of FIG. 1.

FIG. 5 is the block diagram of a memory controller suitable for incorporation into the memory system shown in FIG. 1.

The input samples from source 10 of FIG. 1 are applied to signal path IN of FIG. 5. These samples are channeled to each of the input busses of the memory modules, IN0 through IN3, through direct connection to bus IN. The input samples are also applied to memory system output port RIN through delay 70, coupled between busses IN and RIN. This delay compensates for the time needed to read an addressed item from the memory.

Memory sequencer 80 accepts a nine bit row address, RA; a ten bit column address, CA; a row enable signal, RE; and a memory enable signal, ME, and produces a 17 bit address codeword and a write enable signal for each of the four memory modules. The address codewords appear on busses ADDR0 through ADDR3 and the write enable signals, on output terminals WE0 through WE3. Memory sequencer 80 also generates the signals that are applied to output multiplexers 74 through 78 for channeling the four memory module output signals each to respectively different memory system output port. Signals M1A and M1B control multiplexer 72 to channel one of the four memory module outputs, OUT0 through OUT3, to port R1. M2A and M2B similarly control multiplexer 76 to provide a signal for port R2 and M3A and M3B control multiplexer 78 to provide an output signal on port R3.

The heart of the memory controller is the memory sequencer 80. This is shown in more detail in FIG. 6. The row address signal, RA, is applied directly to delay element 81 and to subtracters 83 and 85. Delay element 81 compensates for the gate delays through the subtracters The output of delay 81 is shown as nine one-bit signals to illustrate how the third and second less significant bits of the row address codeword form signals M3A and M3B respectively. These bits control multiplexer 78 of FIG. 5 which directs one of the four memory module output signals onto memory system output port R3. Signals M3A and M3B also control multiplexer 82 which channels the other seven bits of the row address codeword to one of the four memory module address busses ADDR0 through ADDR3.

Subtracter 83 forms an address codewode at its output that is two less than the one present at its input, modulo 512. For example, if the address on RA is 0, the address at the output of subtractor is 510, two less than 0 modulo 512. The third and second less significant bits of the output of subtracter 83 form output multiplexer control signals M2A and M2B respectively. These signals control multiplexer 84 which directs the other seven bits of the address codeword at the output of subtractor 83 to one of the four address busses ADDR0 and ADDR3. Subtracter 85, similarly, provides an address codeword at its output that is four less, modulo 512, than the address codeword at its input. The third and second less significant bits of this codeword form the output multiplexer control signals M1A and M1B respectively. These signals also control multiplexer 86 to channel the remaining seven bits of the address codeword to one of the four memory module address busses.

The address codeword passed on the memory module address busses is 17 bits wide including the 10 bits of the column address codeword CA in the less significant bit positions and the seven bits from the codeword at the output terminal of one of the subtracters in the more significant bit positions.

Output multiplexer control signals M3A and M3B provide the inputs to one of four decoder 89. The outputs of decoder 89, D0 through D3, feed the four AND gates 91 through 94 respectively. Each of these gates also receives the memory enable signal, ME, and the row enable signal, RE. The output of each of the AND gates is a write enable signal for a respectively different one of the four memory modules. Data samples supplied by source 10 of FIG. 1 are written into the memory cells addressed by row and column address signals RA and CA. The third and second less significant bits of the delayed RA signal (M3A and M3B) control which of the memory modules is selected for writing; the more significant bits and the least significant bit of RA select which memory submodule of the selected memory module is to be accessed for writing. The CA signals control how the submemories in the selected submodule receive the data. Immediately after a datum has been read from a cell of a selected and write enabled submemory, the input datum from source 10 is written into the cell as described in reference to FIGS. 3 and 4 above. A line of samples is written during one cycle of the column address signal from the minimum to its maximum value. Signals ME and RE inhibit the writing of input samples during the vertical and horizontal blanking intervals respectively, to make efficient use of the memory.

In operation, the memory sequencer converts the address signal supplied to it into three address signals and applies each of these to a respectively different one of the four memory modules. Three rows of the memory are accessed during the read interval; one of these three is also accessed for writing. As was explained above, of the three rows that are read, two are adjacent lines of samples from the current field and one is from the prior frame corresponding in position to the later of the two lines from the current frame. The line of input samples currently being supplied by source 10 provides a fourth line of samples to the filter.

For parallel accessing of three lines of samples to be most successful, it is desirable that each of the accessed lines be in a different one of the four memory modules. In the particular embodiment described herein, the rows of the memory are arranged such that lines which are adjacent in the frame have adjacent row addresses. In the context of the described adaptive comb filter, however, adjacent lines of samples in a field are accessed in parallel but adjacent lines in a frame are not. In view of this, the address generator and memory controller are designed to direct pairs of consecutive lines of samples from a frame (i.e. one line from the even field and the next subsequent line from the next odd field) into adjacent rows of the same module. Adjacent lines of samples from the same field, however, are stored in different modules (i.e. the interleaving of the lines of samples among the memory modules is governed by the second and third less significant bits of the row address signal since the rows to be accessed in parallel have either all odd or all even row address values).

Figures 7A, 7B, 7C, 7D, 7E:
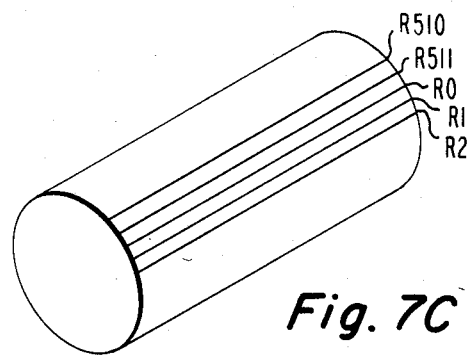
FIGS. 7A–7E illustrate the memory addressing scheme of the embodiment of FIGS. 1–6.

The manner in which rows are accessed to obtain lines of samples can be more easily understood by reference to FIGS. 7A through 7C. In these figures, an even field has been stored in the memory and a new odd field is being stored over the old odd field. FIGS. 7A and 7B represent the state of the memory at, before, and after a single parallel access. The dashed lines are rows containing lines of samples from the even field and the solid lines are rows containing lines of samples from the preceding and succeeding odd fields. The prefix of a line name, —N' or 'O' indicates that the line is from a new or old field respectively; the suffix number describes the position of the line in the frame.

Two of the lines of samples, N3 and O3, in FIG. 7A are lines that occupy the third image line position of a frame. N3 is the line of samples from the current frame, O3 is from the previous frame. Both of these are in memory at once as a result of the scrolling of the image lines which is explained below.

The memory access between times T1 and T2 occurs while samples of line five of the new frame are being supplied to the memory. This access reads lines N1, N3 and O3, supplying these samples to memory system output ports R1, R2 and R3 respectively. Immediately after the row containing O3 has been read, it is filled with the incoming samples of line N5. FIG. 7B shows the state of the memory after these accesses.

Figure 8:
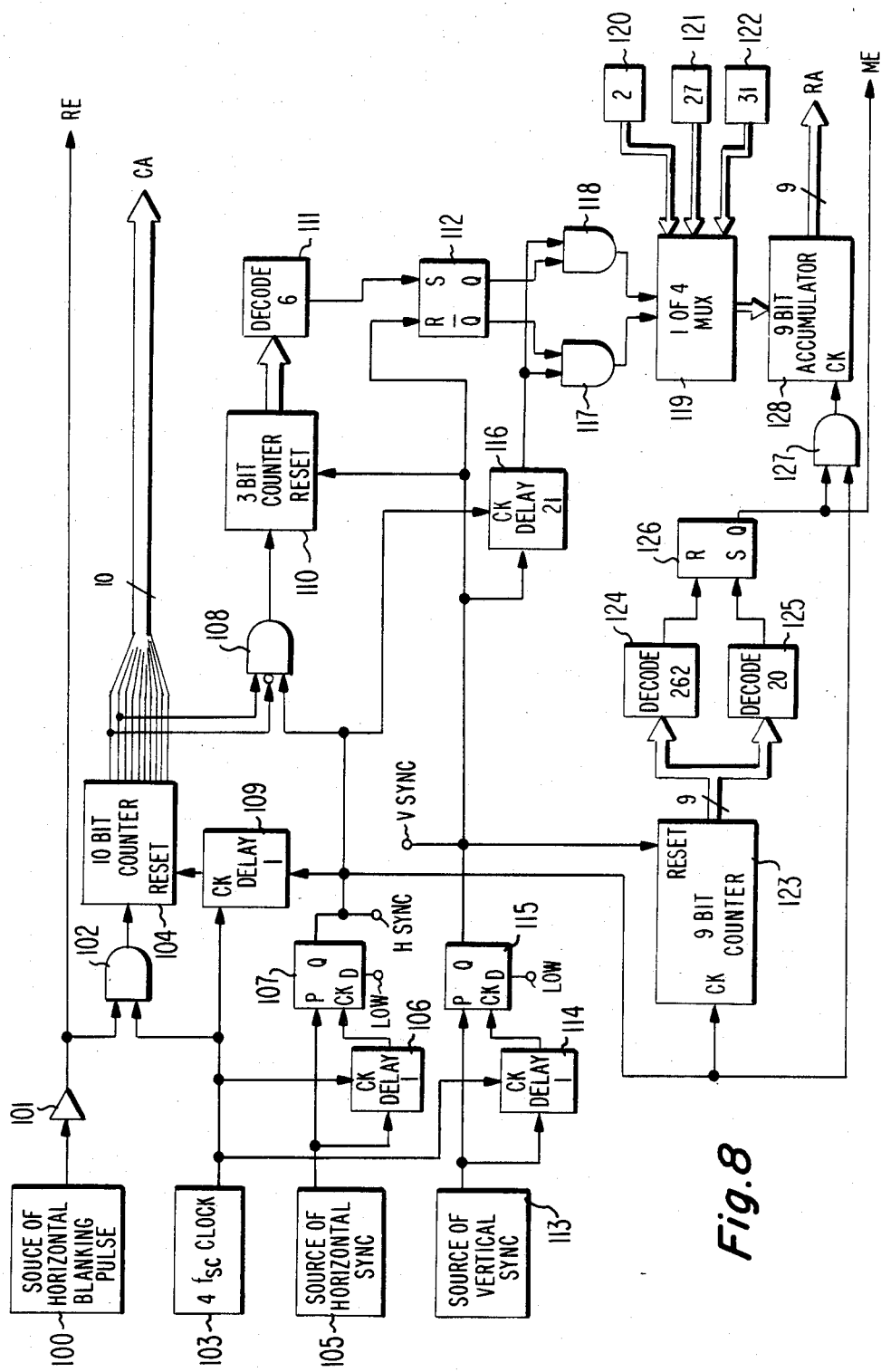
FIG. 8 is a block diagram of an address generator suitable for use with the embodiment of FIGS. 1–6.

It is the scrolling of the image through the memory that allows simultaneous access to two lines, one delayed by a frame time with respect to the other. Scrolling the image delays the overwriting of a line of samples so that it may be read again as input to a filtering process acting on it and on a subsequent line. The manner in which the image is scrolled depends upon the sequence of addresses received by the memory controller. FIG. 8 shows an address generator suitable for supplying addresses to the controller used in this memory system.

The row enable signal, RE, is provided by complementing the horizontal blanking pulse supplied by source 100. Source 100 may be, for example, the horizontal blanking circuitry of a color television receiver. The row enable signal is applied to the memory controller to inhibit the writing of samples into memory during the horizontal blanking interval (HBI). It is also applied to one input of AND gate 102 which disables column address counter 104 during the HBI. The other input to AND gate 102 is the system clock 103. The clock used in this embodiment of the invention operates at four times the color subcarrier frequency (e.g. 14.31818 MHz in the NTSC system) and corresponds to the video signal sample rate. Column address counter 104 counts clock pulses, and therefore video signal samples, during the active portion of a line (the active portion includes all samples on a line except those that occur during the HBI).

The output of counter 104 is the 10 bit column address signal, CA. Counter 104 is reset to zero by the horizontal sync pulse HSYNC. This pulse occurs one clock period after the received horizontal synchronization signal and is developed from the horizontal sync signal supplied by source 105. Source 105 may include the sync separation circuits of a color television receiver. The output signal of source 105 is connected to the preset input terminal (P) of D flip-flop 107. The horizontal sync signal from source 105 is also applied to delay element 106 where it is delayed for one clock period and then applied to the clock input terminal (CK) of flip-flop 107. The data input of flip-flop 107 is connected to a source of low logic signal, LOW. The output signal, HSYNC, from flip-flop 107 is a pulse that begins at substantially the same time as the pulse from source 105 but that has a duration of only one system clock period.

AND gate 108, counter 110, decoder 111 and RS flip-flop 112 constitute an odd field detector. The inputs to gate 108 are the logical complement of the most significant bit of the column address signal, CA, the noninverted secondmost significant bit of CA, and the signal HSYNC. Gate 108 produces a pulse if the horizontal sync pulse occurs at a time when the column address in counter 104 is between 256 and 512. These conditions are satisfied at each equalizing pulse in the vertical blanking interval (VBI) between an even and an odd field and at all but the last equalizing pulse in the VBI between an odd and an even field. These pulses are counted by counter 110 which is reset by the vertical sync pulse, VSYNC. Decoder 111, which is coupled to the output of counter 110, produces a high logic state when counter 110 has counted a number of pulses indicating that the next field is an odd field (e.g. six pulses in the NTSC system). This output is applied to the set input terminal (S) of RS flip-flop 112, the reset input terminal (R) of which is coupled to receive signal VSYNC. Flip-flop 112 produces a low logic signal at its Q output in response to the vertical sync pulse. This becomes a logic high signal if the structure of the equalization pulses following the sync pulse indicates an odd field.

The vertical sync pulse, VSYNC, is developed from the signal provided by source of vertical sync 113, which may include the vertical oscillator of a color television receiver. The output of source 113 is applied to both the preset input terminal (P) of D flip-flop 115 and the one-clock-period delay element 114. The clock input terminal (CK) of flip-flop 115 is connected to the output of delay 114. Source of low logic signal LOW is connected to data input of flip-flop 115. The output of flip-flop 115 is the pulse, VSYNC, occurring approximately concurrently with the leading edge of the vertical sync pulse and having a maximum duration of one system clock period.

Whether a field is even or odd is of interest in this embodiment only when the first active line of the field is being received. At that point in time it is desirable that the row address in accumulator 128 be incremented by an odd number. Two different odd numbers are used, one for transitions from an odd field to an even field and the other for transitions from an even field to an odd field.

The accumulator is incremented by these numbers to switch the address generator from supplying row address codewords for one field (either odd or even) to supplying row address codewords for the other field (either even or odd). These increments also cause the image line locations to be scrolled backwards with respect to the memory rows. In this embodiment, for example, the lines of samples written after one of these odd increments has been applied, are in rows the addresses of which are two less, modulo 512, than the row addresses used for the corresponding lines of samples from the previous frame.

The backward scroll by two lines is used in the present embodiment to delay the overwriting of a line of samples from the previous frame that is to be used by the frame comb portion of the filter. The increment that causes the image to scroll backwards is applied only once in a frame time, just before the first line of an even field is received. Source 121 provides this value.

Multiplexer 119 applies the various increments to accumulator 128. Its data inputs are the two odd values described above from constant sources 121 and 122 and the value 2 from constant source 120. The control inputs to multiplexer 119 are the even and odd field signals from the $\bar{Q}$ and Q output terminals of flip-flop 112 as enabled by AND gates 117 and 118 respectively. The second input to gates 117 and 118 is the vertical sync pulse, VSYNC, delayed through delay element 116 by 21 horizontal sync pulses. The vertical sync signal is delayed to provide a pulse that occurs only once in a field time just before the first active line of the field is processed. An active line, as used herein, is any line containing picture information to the exclusion of any lines occurring during the VBI.

The inputs to multiplexer 119 are arranged so that its output is the constant from source 120 (e.g. 2) when both of its control inputs are logically low, the constant from source 122 (e.g. 31) when its odd control input is logically high, and the constant from source 121 (e.g. 27) when its even control input is logically high. Both odd and even control inputs cannot be logically high at the same time.

Accumulator 128 adds the signal applied to its input to its accumulated sum each time a pulse is received at its clock input. The pulses occur only during active lines and are supplied by the circuit consisting of counter 123, decoders 124 and 125, RS flip-flop 126 and AND gate 127.

Counter 123 has horizontal sync pulses, HSYNC, applied to its clock input, and vertical sync pulses, VSYNC, applied to its reset input. After a vertical sync pulse has occurred, counter 123 begins to count horizontal sync pulses. Assuming that the vertical sync pulse occurred just before the third serration pulse, 21 horizontal sync pulses will have occurred before the first active line is processed (the 21 pulses include four from the remaining serrations, six from the equalizing pulses and eleven from the blank lines at the end of the VBI). Decoder 125 allows 20 of these pulses to occur before setting flip-flop 126. The 21st horizontal sync pulse is passed by AND gate 127 causing the interfield value (either 27 or 31) to be added into the accumulator. By the time the 22nd pulse is passed, the interline value (2) is at the output terminal of the multiplexer. This value is added for every horizontal sync pulse passed by gate 127 until the end of the field. Decoder 124, however, limits the number of horizontal sync pulses that are passed to the number of active lines in the field. When decoder 124 counts 262 pulses, it resets flip-flop 126 disabling clock input to the accumulator. The signal at the Q output of flip-flop 126 which enables or disables the accumulator through AND gate 127 is also the memory enable signal, ME, that is applied to the rest of the system. The output signal of accumulator 128 is the row address, passed to the memory controller via bus RA.

The scrolling of the image in memory may be more easily explained with reference to FIGS. 7C, 7D and 7E. FIG. 7C represents the memory address space as a cylinder; memory row 0 follows immediately after memory row 511. Although the memory is physically implemented as an array having row 0 at one end and row 511 at the other, the memory appears to be a cylinder because of the modular arithmetic of row addressing, in which the nine bit row addresses cycle through the 512 values that the output codeword of the accumulator 128 can take on. As the accumulated sum becomes greater than 511, modulus of the accumulator causes the stored sum to begin again at zero. For example, when 2 is added to 511 the result is 513. The number in the accumulator is 513 modulo 512, or 1.

The cylindrical organization of memory row addressing is exploited in switching between fields. The numbers between FIGS. 7D and 7E having "R" as a prefix apply to both figures and indicate the actual memory row address (e.g. R0 identifies row 0 of the memory). The numbers at the left of FIG. 7D identify the line positions in the frame. Those with an "O" prefix are in the old frame and those with an "N" prefix are in the new frame. In FIG. 7D, line N482 has just been written into memory row R482. The next line written will be the first line of the following odd field, line 1. To scroll the image as described above, this line is desirably written into row R1. The jump from row R482 to row R1 is accomplished by adding the constant 31 from source 122 in FIG. 8 to the row address in accumulator 128.

FIG. 7E shows the same memory row addresses after the odd field has been written, and just before the switch to the even field. Since the previous line zero was placed in memory row zero, it is desirable to place the new line zero into memory row 510, in order to continue the scrolling of the image through the memory. This is accomplished by adding the constant from source 121 (27) to the accumulated row address (0483, the last line of the old odd field).

Figure 9:
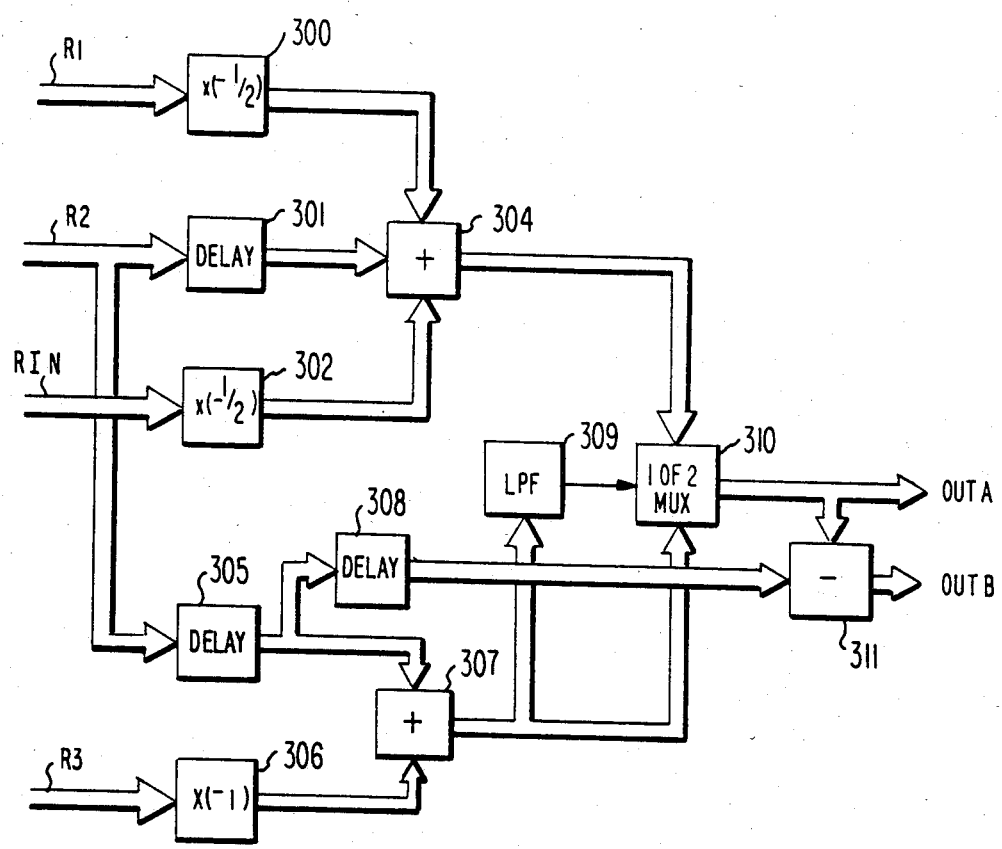
FIG. 9 shows an adaptive comb filter suitable for use with the embodiment shown in FIGS. 1–8.

The last part of this illustrative embodiment of the present invention to be described is the signal processor 50 shown in FIG. 1. FIG. 9 shows an adaptive comb filter suitable for use as this signal processor.

Processor 50 contains both a line comb filter and a frame comb filter. Frame comb filters provide superior filtering performance in the absence of interframe image motion while line comb filters generate less objectionable performance in the presence of interframe motion. Thus, superior overall filter performance is acquired by switching between the frame comb filter and the line comb filter in the absence and presence of interframe image motion respectively.

Memory system output port R2 carries the samples of the line to be filtered. Port R2 is connected to delay elements 301 and 305. Memory system output ports R1, RIN and R3 are connected to signal scalers 300, 302 and 306 respectively. Port R1 transmits samples of the line before the line to be filtered and port RIN, samples of the line after. The lines of samples transmitted through ports R1, R2 and RIN are all from the same field. The line of samples at port R3 is the one corresponding spatially to the line of samples at port R2, but from the previous frame.

The outputs of scalers 300 and 302 and the output signal of delay 301 are summed in adder 304 to form a line combed chrominance signal at the output of adder 304. Similarly, adder 307 accepts the output signals from delay 305 and scaler 306 as input signals and produces a frame combed chrominance signal as its output signal. LOW pass filter 309 is responsive to the frame combed chrominance signal for extracting from it luminance cross components indicative of interframe motion. As such, low pass filter 309 may be utilized as a motion detector. Whenever the output signal of filter 309 rises above a threshold value multiplexer 310 switches its output signal from the frame combed chrominance signal applied to one of its inputs to the line combed chrominance signal applied to its other input.

The samples of the line to be filtered from the output of delay element 305 are further delayed by delay element 308 to compensate for the time required to process the two chrominance signals. The output of delay element 308 is applied to the minuend input terminal of subtracter 311 with the subtrahend input terminal being the chrominance signal from the output terminal of multiplexer 310. The output of subtracter 311 is a combed luminance signal and is available at signal processor output port OUTB. A line or frame comb filtered chrominance signal, which may include relatively low frequency luminance signal components from the output terminal of multiplexer 310 is available at port OUTA.

The foregoing description is directed to an NTSC system by the values used for the constants and decoders in the clock generator and by the number of bits contained in the row address. However, a similar embodiment can be practiced in the context of a PAL or SECAM system with appropriate modification of these constants and the row address bus width.

The second illustrative embodiment of the invention presented herein is a television memory system suitable for use in a receiver that displays the received interlaced scan image using a progressive scan and also filters the signal that produces the image to reduce high frequency noise components. The progressive scan used in this embodiment employs double shuttering, a method by which a full frame is displayed at the field display rate of a conventional interlaced scan system. Illustratively, for an NTSC signal, field images are displayed at a rate of 60 times each second. When double shuttering is used, a progressive frame scan system refreshes the entire frame at this rate. A progressive scan system that did not refresh at the field rate would display images at the frame repetition rate (e.g. 30 times each second for NTSC), resulting in an undesirable low frequency flicker in the displayed image. A low frequency flicker can also occur as an artifact of horizontal motion even at the doubled scan rate. This occurs when the fields that make up the displayed frames are not in a fixed temporal relationship (i.e. if in one frame the even field is the one that occurred before the odd field being displayed but in the next frame the even field is the one occurring after the odd field). To eliminate the low frequency flicker from this second source, the second embodiment of the present invention generates frame images composed of even fields and their next subsequent odd fields. Each frame image is displayed twice, to provide double shuttering.

The low pass filter used in the present embodiment is a three tap transversal FIR filter. Three unfiltered lines of samples from the current field are input to the filter. The line of samples at the output of the filter is written into memory as a filtered replica of the unfiltered line supplied to the center input of the filter. A three tap filter is shown as an aid in describing the invention. A more desirable filter, having a greater number of taps could be implemented by using a memory system with a larger number of memory modules.

Scrolling is used in the present embodiment to delay overwriting the three unfiltered lines of samples until the filtered line derived from them can be written into memory, and also to delay overwriting the line of samples from the prior frame that corresponds to this filtered line until the filtered line can be written into memory.

Figure 10:
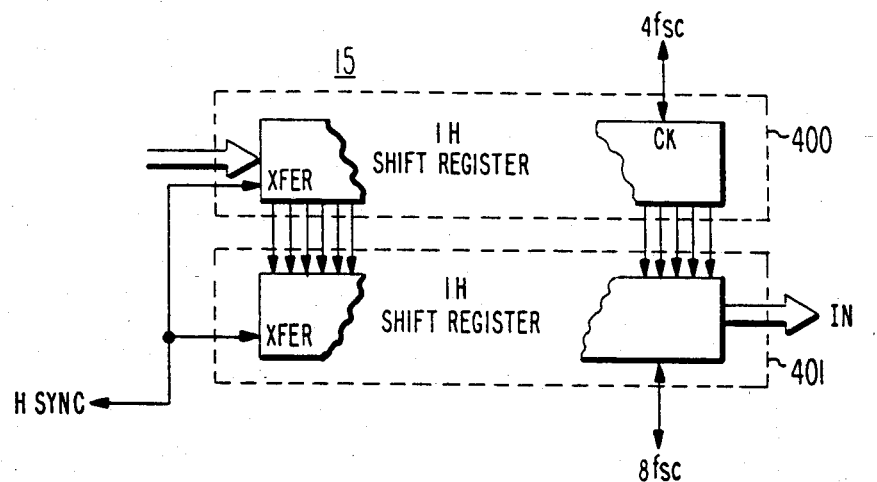
FIG. 10 is the block diagram of a scan converter suitable for use with the alternative embodiment shown in FIG. 1.

This second embodiment is shown in FIG. 1 when the scan converter 15 and signal busses and interconnections RO, INF, OF, OL and HS, drawn in phantom, are considered part of the apparatus. The major diferences between this embodiment and the first embodiment are the scan converter 15 and signal path INF. FIG. 10 is a block diagram of a scan converter suitable for use in the present invention. Shift register 400 accepts samples provided at the conventional rate for interlaced scan signals (e.g. four times the subcarrier frequency or 14.31818 MHz for NTSC) samples are loaded into register 400 until the occurrence of the horizontal sync pulse, HSYNC. This pulse causes register 400 to transfer its contents in parallel to register 401. The samples are shifted out of register 401 at twice the sample rate at which they are provided to register 400 (e.g. 28.63636 MHz for NTSC).

Since the samples in this second embodiment are provided to the memory system at twice the rate of the samples in the first embodiment, the memory operates at twice the speed. This higher speed is within the capabilities of the memory modules described above employing available memory devices.

Signal INF is a second data input to memory controller 20. Samples of this signal and of input signal IN are written into the memory in parallel. The samples that constitute INF are provided by signal processor 50 which, in the present embodiment, includes a low pass filter instead of the comb filter used in the previously described embodiment. Processor 50 is supplied with data samples by the four memory controller output ports R0 through R3; port RIN is not used in the present embodiment. Signal processor 50 provides two output signals, one on bus INF and the other on port OUTA. Port OUTB is not used in this embodiment. Signal processor 50 and memory controller 20 also accept the odd field, OF; odd line, OL; horizontal sync, HS; and memory enable, ME, control signals supplied by address generator 30.

Figure 11:
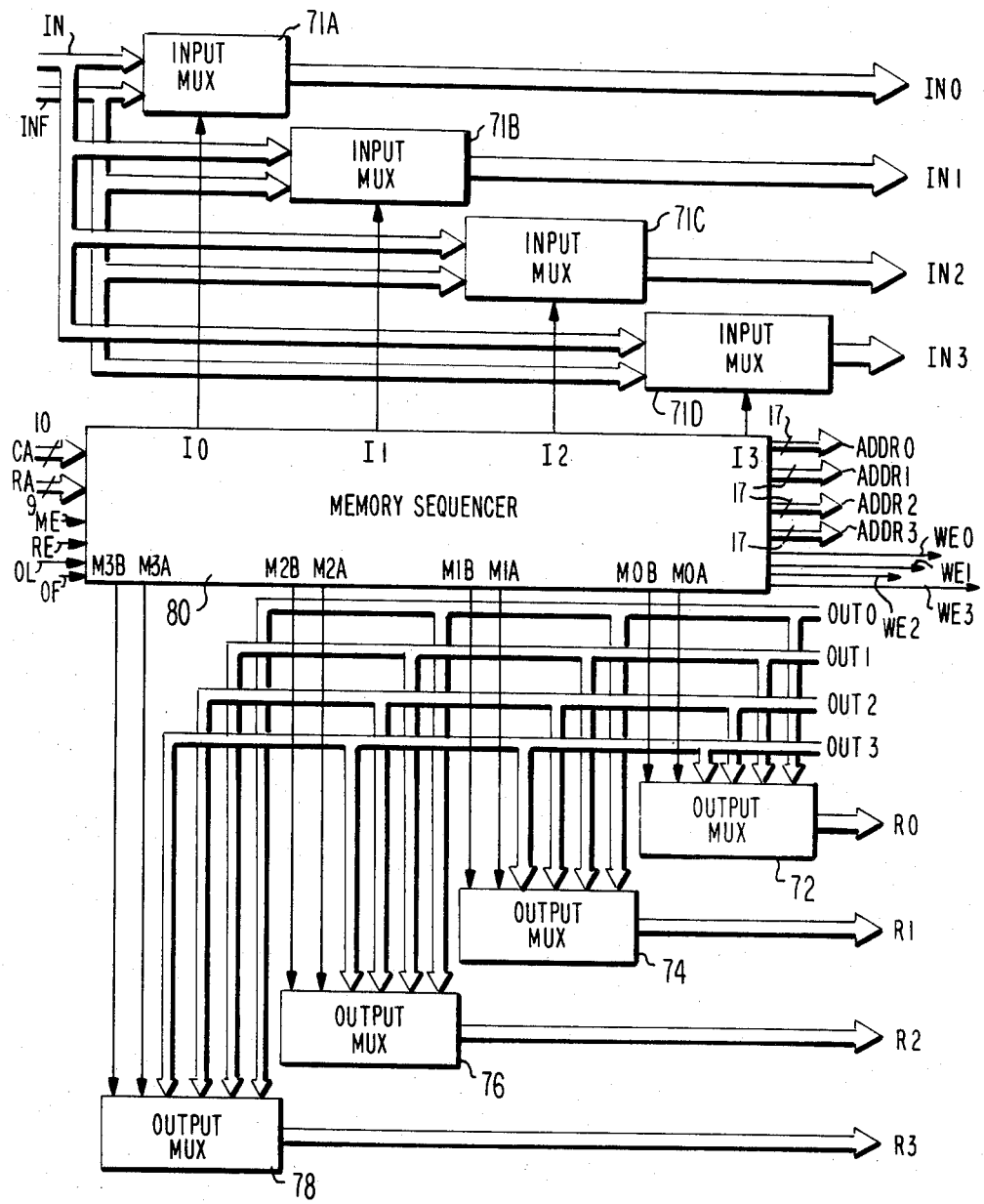
FIG. 11 is a block diagram of memory controller suitable for use with the alternative embodiment shown in FIG. 1.

FIG. 11 is the block diagram of a memory controller suitable for use with the present embodiment. This controller is similar to the one shown in FIG. 5. The differences reside in the addition of input multiplexers 71A through 71D and output multiplexer 72. Each of the input multiplexers responds to one of the control signals I0 through I3 to channel the samples from input bus INF to respective memory module input busses IN0 through IN3 when the control signal is logically low, and to channel samples from path IN if the control signal is high. Output multiplexer 72 responds to the control signals MOA and MOB to switch the signals from one of the four memory module output ports OUT0 through OUT3 onto memory system output port R0.

Figure 12:
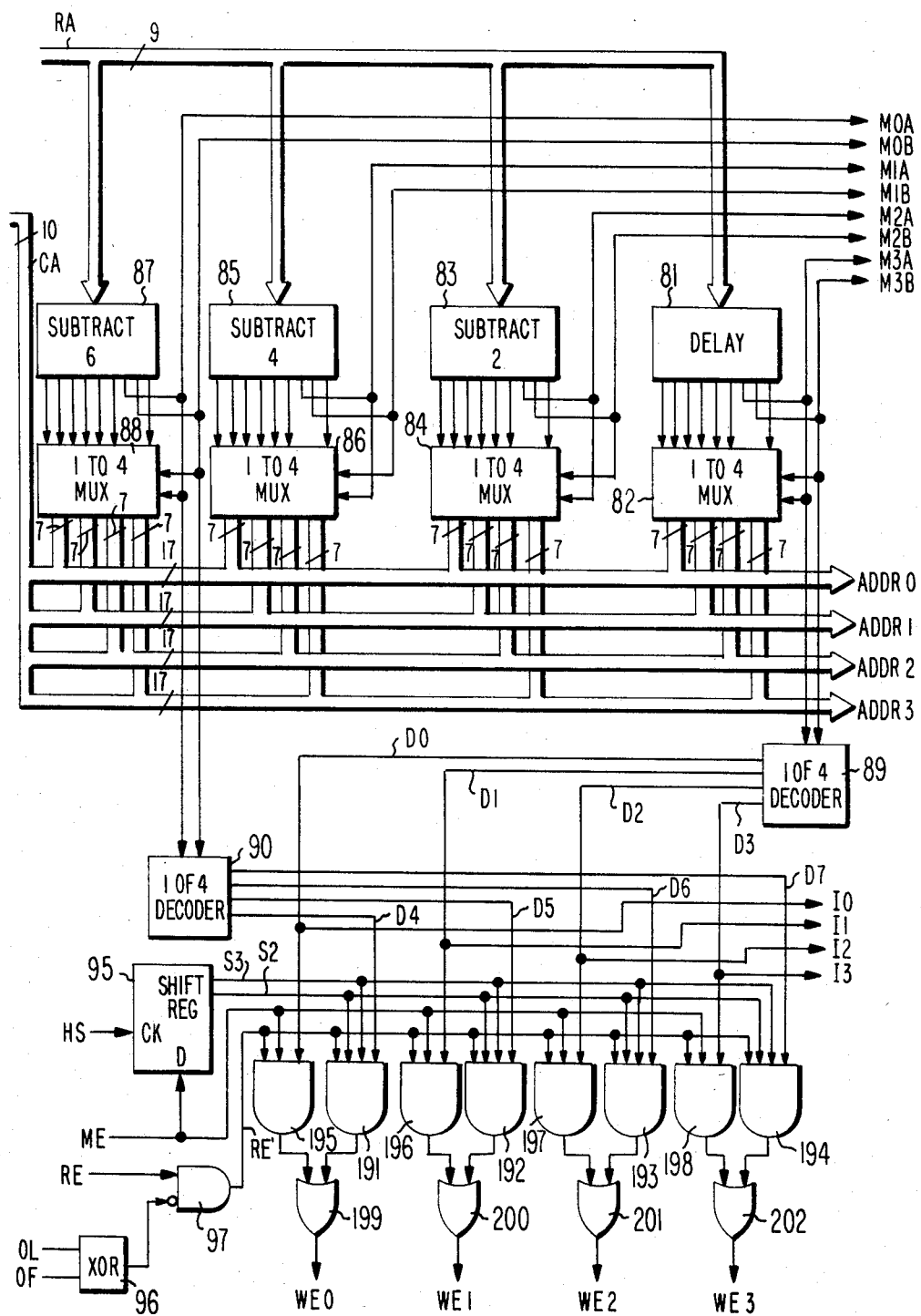
FIG. 12 shows the memory sequencer of the memory controller shown in FIG. 11.

The memory sequencer used with the present embodiment is shown in FIG. 12. It is similar to the one used in the previous embodiment (FIG. 6) with the addition of subtracter 87, multiplexer 88 and the more complicated logic for producing the write enable signals WE0 through WE3.

Subtracter 87 and multiplexer 88 provide control signals MOA and MOB for decoder 90 and for multiplexer 72 of FIG. 11. They also provide a row address for the line of samples that has a frame line number six less than that of the line of samples currently being provided by the scan converter (i.e. the third most recent line in the current field). The other subtracter-multiplexer pairs of this synchronizer operate identically to those of FIG. 6.

Figure 6:
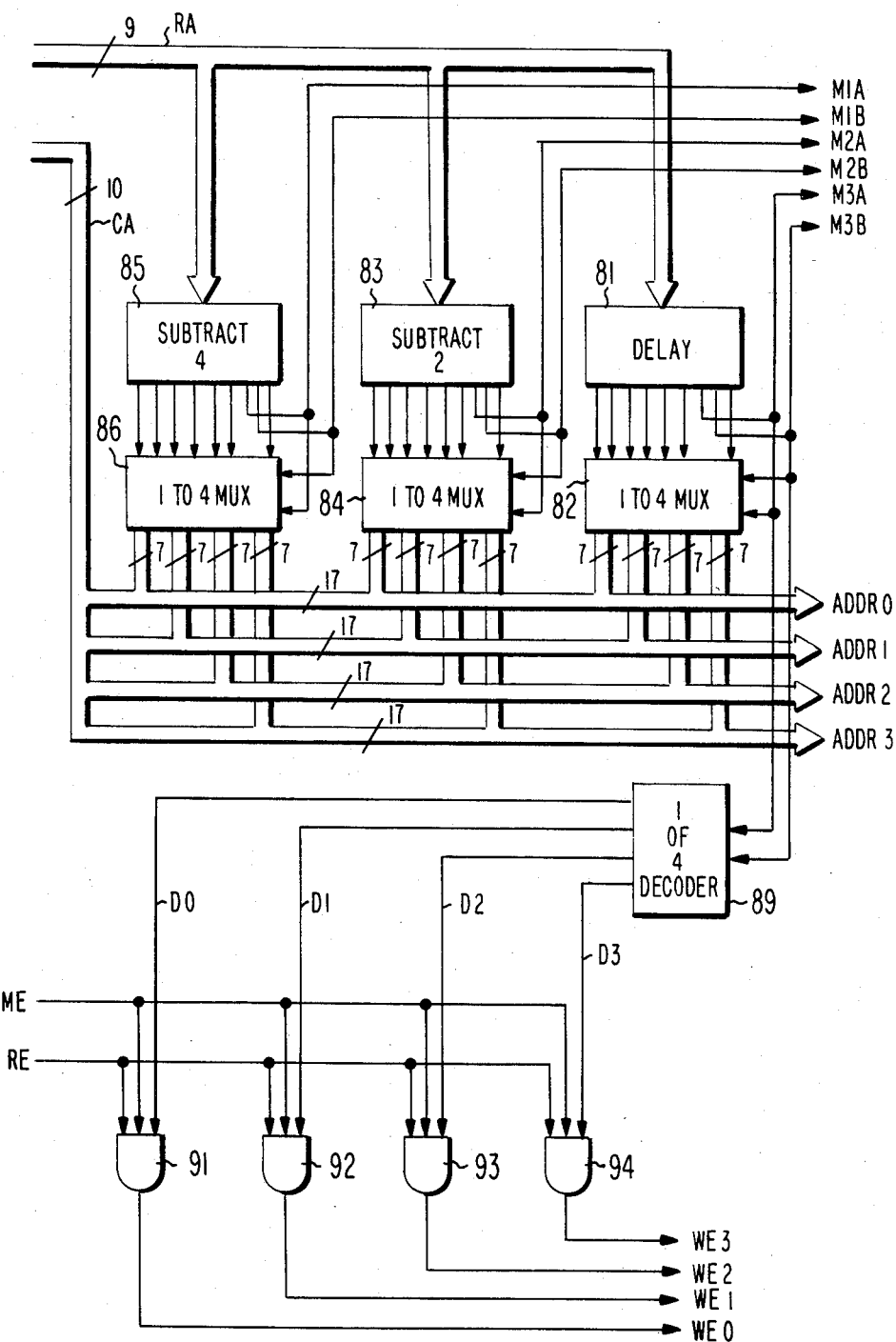
FIG. 6 is a block diagram of the memory sequencer shown in FIG. 5.

The write enable logic for the sequencer shown in FIG. 12 is somewhat more complex than that shown in FIG. 6. This added complexity is partly due to the simultaneous writing of two lines and partly an accommodation of progressive scan. The circuitry that produces each write enable signal includes two AND gates and one OR gate. This part of the circuitry is similar for all four of the write enable signals. The only difference among these circuits resides in the selection of input signals applied to the AND gates from decoders 89 and 90. In view of this similarity, it is sufficient to describe how the signal WE0 is generated to understand how all of the write enable signals WE0 through WE3 are provided.

WE0 controls the writing of the samples supplied via bus IN or bus INF into memory module 40. If the samples are from bus IN, they are to be written into the row addressed by signal path RA. If this row is in memory module 40, the D0 output of decoder 89, which supplies one input of AND gate 195, has a logically high state. The other two inputs to gate 195 are signals ME and RE'. Signal ME is applied to ensure that no write enable is generated during the VBI, when no active lines are being received. Signal RE' performs two functions, it inhibits writing during the HBI and when a line from the previous field is being read from memory for display. This second function is a part of the implementation of double shuttered progressive scan.

At any given time, samples from only one field are supplied by the scan converter, yet samples from two fields are displayed. The lines of samples for the second field come from memory. Since no data is being supplied as these lines are being read, write enable signals need not be generated. It would be undesirable to overwrite these samples, moreover, since, for double shuttering, each of the stored lines of samples is displayed twice. One function of the signal RE, therefore, is to inhibit the generation of write enable signals while these lines of samples from the second field are being read from memory.

The output of exclusive OR gate 96 is logically low when a line with an odd address from an odd frame is being processed (signals OL and OF are both logically high) or when an even line from an even frame is being processed (signals OL and OF both logically low). The complement of the exclusive OR output signal is applied to AND gate 97, the other input of which is the row enable signal, RE. The output of gate 97, signal RE', applied to each of the AND gates 191 through 198, thus allows write enable signals to be generated only when lines of samples are being received at the input busses, and only for those samples in the active portion of a line.

AND gates 191 through 194 control the writing of samples from signal path INF. The address of the row into which these samples are to be written appears at the output of subtracter 88. If this row is in module 40, output D4 of decoder 90, which supplies one input to AND gate 191, is logically high. The other two inputs to gate 191 are signal paths RE' and output signals S2 and S3 of shift register 95.

The clock input signal to register 95 is the horizontal sync signal, HS, and the data input is the memory enable signal, ME. The two output signals of register 95, S2 and S3, are the memory enable signal delayed by two and three horizontal line intervals respectively. These signals are applied to the write enable logic to delay writing the first filtered line of samples into memory until the lines of samples that serve as inputs to the filter have been written into memory, and to continue writing filtered samples for two lines after the last unfiltered samples have been received, in order to empty the pipeline.

The filter described below as a part of signal processor 50 is provided with three consecutive lines of input samples from a given field and produces one line of filtered output samples corresponding to the second of the input lines. To provide a filtered version of the first line of a field, the signal processor uses a null line and the first and second lines of samples from the scan converter. As these lines are not available to the signal processor until two line periods after the memory enable signal goes to a logically high state, the processing and writing of filtered samples must be delayed by this amount of time. This delay is needed to fill the pipeline at the start of a field and also to empty the pipeline at the end of a field. When the memory enable signal goes to a low logic state, the last line of a field has just been written into memory. The writing of filtered lines, since it was delayed by two line periods at the start of the field, continues for two lines after the last line of the field has been received.

Figure 15:
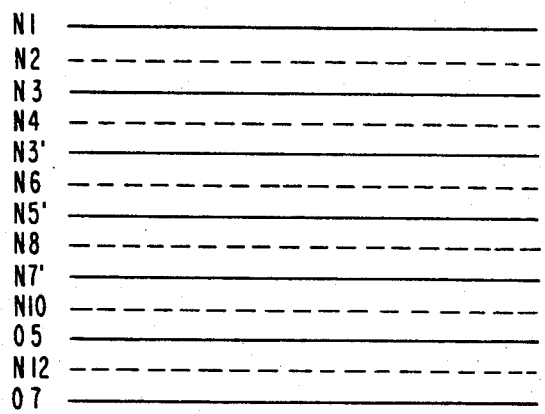
FIG. 15 illustrates the operation of the memory addressing circuitry used in the embodiment shown in FIGS. 1–3 and 10–14.

It is helpful to understand how the lines of memory are accessed by the present embodiment to understand the operation of the memory sequencer. FIG. 15 shows several lines of an image in memory as line nine of the new odd field is being received. At this time, all of the new even lines and the old odd lines have been filtered and rewritten into memory. The new odd line N3 was the last line of filtered samples written into memory. Lines N3', N5' and N7' are unfiltered odd lines from the new field. The access currently in process places lines N', N5', N7' and O5 onto memory output lines R0 through R4 respectively and writes the filtered line N5 over the unfiltered line N3'. Unfiltered input samples of line nine are simultaneously written over the samples of line O5.

It is noted that the scrolling circuitry used in the present embodiment causes unfiltered samples to be written into a row address that is four less than the row containing the analogous filtered line from the prior frame.

Figure 13:
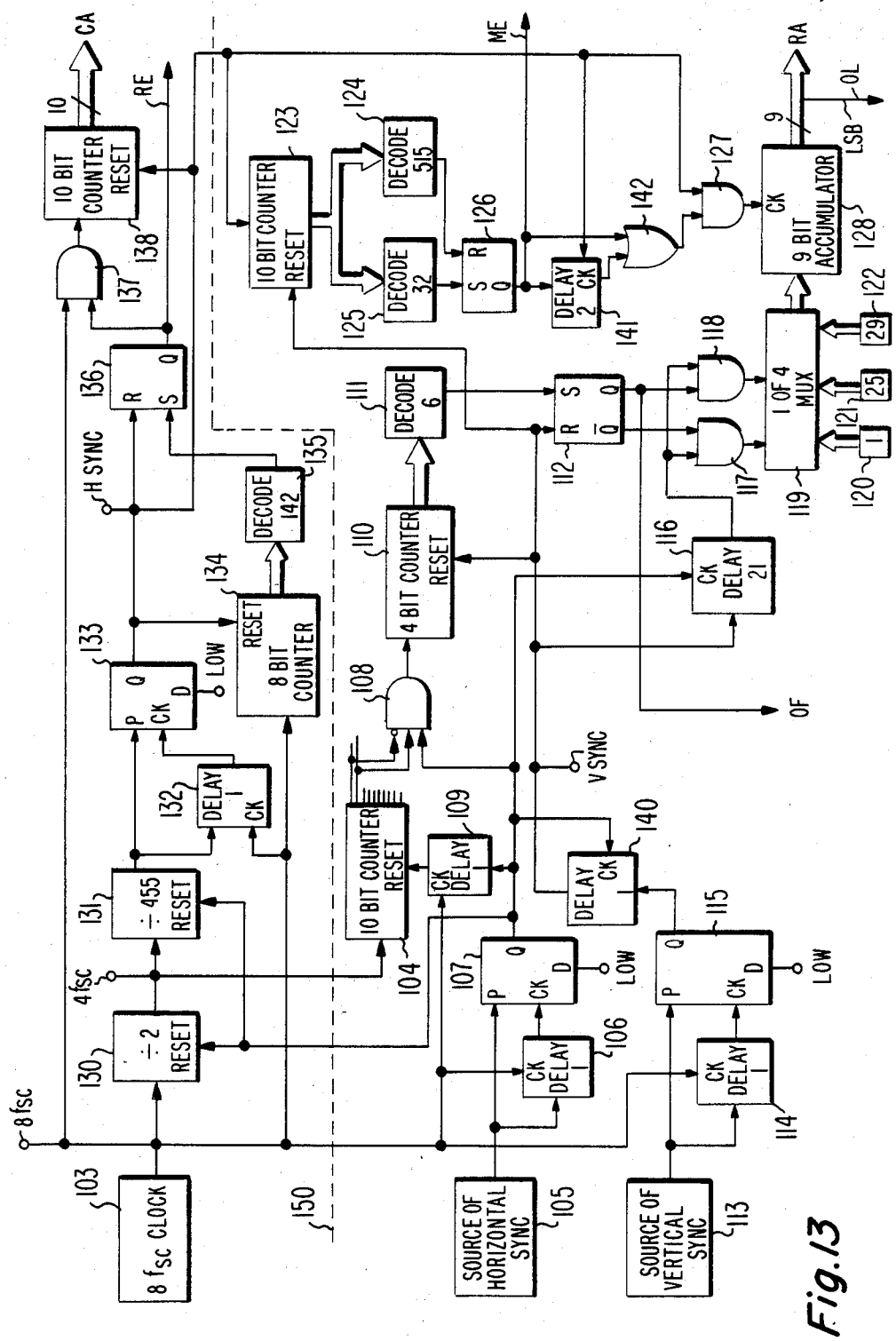
FIG. 13 shows an address generator suitable for use in the embodiment of FIGS. 1–3 and 10–12.

The clock generation logic that implements this scrolling technique is shown in FIG. 13. The blocks below the dashed line 150 are functionally similar to the like numbered blocks shown in FIG. 8. The only differences are the delay elements 140 and 141, OR gate 142 and the values used in conjunction with constant sources 120 through 122 and decoders 124 and 125.

Delay element 140 is interposed in the VSYNC line to delay the occurrence of the vertical sync signal for one horizontal line period. This compensates for the time needed to scan-convert one line. Delay element 141 and OR gate 142 combine to keep the accumulator 128 producing row addresses for two lines following the last received line of a field.

The different constants are a result of the use of progressive scan and the scrolling technique described above. Decoder 125 sets flip-flop 126 when 32 of the generated horizontal sync pulses have been counted by counter 123. Counter 123 is reset by the delayed vertical sync pulse VSYNC. The 32 pulses, then, represent the 32 one-half interlaced-scan line intervals between the time that the pulse on VSYNC occurs and the time that the first line is displayed. Likewise, decoder 124 resets flip-flop 126 after the 483 active lines that make up a single progressive scan frame have been processed. The constant 1 of source 20 is the increment used to display all of the 483 active lines in the frame. The constant value produced by source 121 is that used to switch from receiving lines of samples from an odd field to receiving lines of samples from an even field while scrolling the image backward by four lines. The constant produced by source 122, similarly, is used to progress from even fields to odd fields.

Two new output signals, OF and OL, are provided by the present clock generator. Flip-flop 112 produces a signal OF that is logically high only when lines of samples from an odd field are being received. OL is the least significant bit of the row address RA and is, therefore, logically high when the output signal of accumulator 128 addresses an odd line.

The primary difference between the present clock generator and the one shown in FIG. 8 is the logic used to generate column addresses and the HSYNC signal. Since the present embodiment operates at twice the line scanning frequency of the received signal, its horizontal sync pulses are generated by counting the clock pulses at eight times the color subcarrier frequency ($8f_{sc}$) provided by clock 103. The clock signal is applied to cascade connected dividers 130 and 131 which provide output signals having frequencies of $4f_{sc}$ and the horizontal line frequency ($f_h$) respectively. Both of these dividers are synchronized to the incoming horizontal line frequency via the connection between the output of terminal flip-flop 107 and their respective reset inputs. The output signal from divider 131 and the delayed (by one clock period) output signal from divider 131 are applied respectively to the preset (P) and clock (CK) inputs of flip-flop 133. The data input of flip-flop 133 is connected to source of low logic signal LOW. The output of flip-flop 133 is the signal HSYNC having a one-clock-period pulse-width and a repetition rate of twice the interlaced-scan horizontal line frequency. HSYNC is the clock signal input to line counter 123 and the reset input to both flip-flop 136 and counter 134. Counter 123 counts the number of lines that remain in the VBI after the vertical sync pulse and the number of active lines in a frame as described above. Counter 134 counts clock pulses occurring after the HSYNC pulse. Decoder 135 which is coupled to counter 134, produces a logically high signal after 142 pulses are counted. This indicates the end of the HBI. The output of decoder 135 sets flip-flop 136 which was reset by HSYNC. The signal at the Q output of flip-flop 136 is the row enable signal RE.

The system clock signal from generator 103 is one input signal to AND gate 137, and the other input is RE. Gate 137 supplies counter 138 with clock pulses during the active portion of a line. The output signal of counter 138 is the column address signal CA.

A delay has been incorporated into this memory system to compensate for the processing time used to read and filter the lines of unfiltered samples from ports R0 through R2 before the corresponding line of filtered samples is written into the memory via bus INF. This delay is implemented as a column write-address offset. The lines of unfiltered samples provided by the scan converter are stored using column addresses that start at zero. Lines of filtered samples, however, start at column address four. This delay is built into the present embodiment. Scan converted input samples are sent to the memory starting at the end of the horizontal blanking interval and continuing until the horizontal sync pulse. This period includes information that is not of interest, i.e. the front porch of the sync pulse. It is this data that is overwritten by the active samples at the end of the filtered line.

Figure 14:
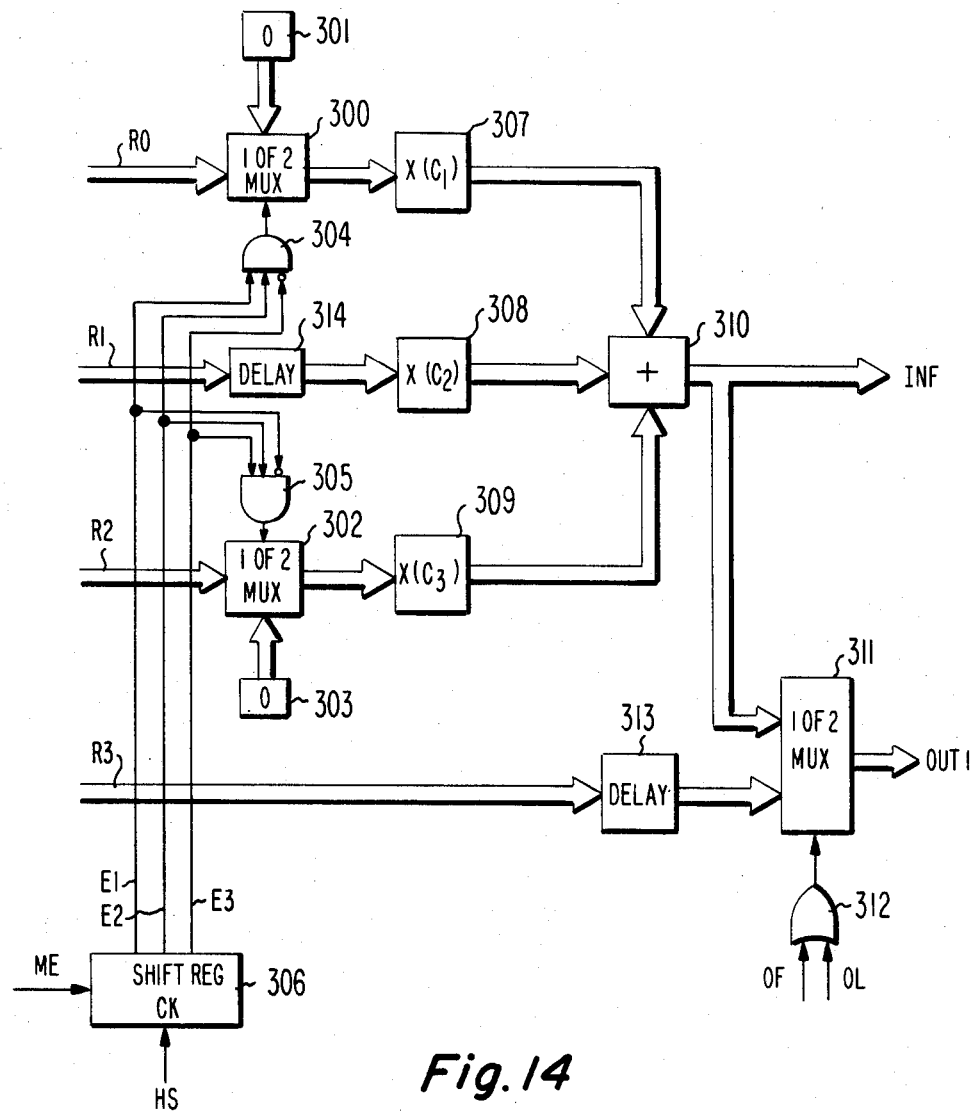
FIG. 14 is a block diagram of a transversal filter suitable for use with the embodiment shown in FIGS. 1–3 and 10–13.

A block diagram of the signal processor used by this second embodiment of the present invention is shown in FIG. 14. Memory system output signal paths R0, R1 and R2 are coupled to the inputs of multiplexer 300, delay 314 and multiplexer 302 respectively. Each of the two multiplexers has a second data input, a constant equivalent in value to a black image sample. These constants are illustrated in FIG. 14 by constant source 301 for multiplexer 300 and constant source 303 for multiplexer 302. The black signal is channeled through multiplexer 300 when the first line of a field is to be filtered, i.e. when no line before the line to be filtered resides in memory. Similarly, the black signal is channeled through multiplexer 302 when the last line of a field is being filtered. Shift register 306, which shifts the memory enable signal, ME, one place each time a horizontal sync pulse is applied to its clock input, and AND gates 304 and 305 ensure that the multiplexers pass the black signals at the appropriate times. The three outputs of register 306, E1, E2 and E3, are the memory enable signal delayed by one, two and three progressive-scan horizontal line intervals respectively.

Respective output signals from multiplexer 300, delay 314 and multiplexer 302 are applied to the inputs of scaling circuits 307, 308 and 309 which multiply the respective signals by constant factors. These scalers provide respective scaled input signals to adder 310 and together with adder 310 form a transversal finite impulse response (FIR) filter. The values of the scaling constants are chosen to produce the frequency response characteristic desired from the filter. Output samples from adder 310 are the filtered signal that is fed back into the memory via bus INF.

Bus INF also provides one of the data inputs to multiplexer 311. The other data input is the previously filtered and stored line from the prior field supplied via memory system output port R3 and delay element 313. Multiplexer 311 is controlled by the output signal from OR gate 312. The inputs to gate 312 are odd field (OF) and odd line (OL) signals provided by the clock generator. When the output of gate 312 is logically low, multiplexer 311 passes the line of samples from the output of the filter, otherwise it passes the line from the memory system output port R3.

Stated another way, the output of the FIR filter appears at memory system output port only when even lines are being displayed and an even field is being received. Otherwise, the line at OUT1 is the previously filtered and stored line from the previous field or previous frame.

As described above, a double shuttered progressive scan image displays a low frequency flicker artifact if the fields that make up the displayed frame are not in a fixed temporal relationship with respect to each other. In the present system, the displayed odd field is always the one immediately following the displayed even field. When lines of samples from an even field are being received, therefore, the lines of samples provided by the signal processor are from the output terminal of the FIR filter (the output of adder 310) for even lines, and from the memory output port R3 for odd lines. When the lines of samples provided by the scan converter are from odd fields, however, both odd and even lines of samples are taken from Port R3. The new odd lines of samples are written into the rows that held the old odd lines after the old lines have been provided to the signal processor.

The embodiment described above produces progressive scan signals for a full image frame at its output. As a result of the interlacing of the two fields that make up the frame, adjacent lines may have chrominance components that have the same phase or that have opposite phases. So, to ensure phase synchronization of the color subcarrier reference oscillator, the circuitry that processes these signals may also need the odd line and odd frame signals, OL and OF, to control selective phase inversion of the chrominance component of a line of samples. Moreover, further processing of the chrominance component may also be desirable if a comb filter is employed for separating the luminance and chrominance components.

In the illustrative embodiments described above, the number of memory outputs and thus the number of filter taps could be increased by adding more memory modules and by appropriately modifying the memory controller and signal processor to handle the larger number of memory modules and module outputs. A further reason for increasing the number of memory modules would be to accommodate the refresh cycles of a dynamic memory. If there were one or two more memory modules than filter taps, the unused modules during each read cycle could be placed in a refresh mode. As each module would be one of the unused modules in the regular cycle through the modules, the memory would remain refreshed.

The apparatus for implementing progressive scan and for implementing the low pass filter can be separated, and each implemented using a memory system within the scope of the present invention.

What is claimed is:

1. A memory system for the storage of sampled video signals comprising:
   a source of sampled lines of raster scanned video signals;
   a memory including:
      an input port coupled to said sample supplying means;
      a plurality of output ports, P in number;
      an array of storage locations addressed by rows and by columns, having a sufficient number of rows to contain at any time M successive lines in the final portion of one field of said raster scanned video signal and N successive lines in the initial portion of a second field, where M and N sum to a value greater than the number of lines in one field, said columns of said array of storage locations being arranged such that successive ones of said columns correspond to successive picture element samples in each line of said raster scanned video signal, and wherein said rows are interleaved to provide parallel access to at least P rows;
      means for parallelly accessing at least P of said rows including means for reading each of said parallelly accessed rows at a respectively different one of said P output ports and means, coupled to said input port, for writing a line of samples into at least one of said parallelly accessed rows;
   means for scrolling access to said parallelly accessed rows with row advance rate synchronized to the line advance rate of said raster scanned video signals.

2. A memory system as set forth in claim 1 further including,
   sample processing means responsive to at least one of the signals from said output ports and to the signal from said source for providing a filtered replica of one of said signals.

3. A memory system as set forth in claim 2 wherein:
   said samples provided by said source are samples of composite video signals including luminance components and chrominance components; and
   said sample processing means include means for combining the samples from at least one of said P output ports and from said source for providing samples of separated luminance and chrominance signals.

4. A memory system as set forth in claim 3 wherein:
   the M rows of said memory contain the lines constituting the final portion of a first frame of said raster scanned video signals;
   the N rows of said memory contain the lines constituting the initial portion a second frame, being the frame immediately following said first frame, and wherein the numbers M and N sum to a number greater than the number of active lines in one frame of a raster scanned video signal;
   said means for scrolling parallel across to said P rows includes:
      means for accessing a first row through a first one of said P output ports, said first row containing samples from a first line, which corresponds to a line immediately preceding the line currently being supplied to said source;
      means for accessing a second row through a second one of said P output ports, said second row containing samples from a second line which corresponds to the line immediately preceding said first line; and
      means for accessing a third row through a third one of said P output ports, said third row containing samples from a third line being the line in the first frame that corresponds in position to said first line in said second frame.

5. A memory system as set forth in claim 4, further including:
   sample processing means responsive to at least one of the signals from said output ports and to the signal from said source for providing a filtered replica of one of said signals.

6. A memory system as set forth in claim 5, wherein:
   said sample processing means includes an adaptive comb filter comprising:
      means coupled to said first and third output ports for algebraically combining samples provided thereby to produce a first set of filtered signal samples corresponding to separated chrominance signals;
      means coupled to said first and second output ports and to said input port for algebraically combining samples provided thereby to produce a second set of filtered signal samples corresponding to separated chrominance signals;
      a motion detector responsive to said first set of chrominance samples for generating an output signal upon the occurrence of interframe image motion;
      means responsive to the output signal of said motion detector and to said first and second sets of luminance and chrominance samples for providing samples from said first set when the output signal of said motion detector has a value indicative of a relatively small amount of interframe motion and for providing samples from said second set otherwise.

7. The apparatus set forth in claim 6 wherein said motion detector includes a low pass filter.

8. A memory system as set forth in claim 1 wherein:
   the M rows of said memory contain the lines constituting the final portion of a first frame of said raster scanned video signals;
   the N rows of said memory contain the lines constituting the initial portion of a second frame immediately following said first frame and wherein the numbers M and N sum to a number greater than the number of active lines in one frame of a raster scanned video image;

said means for scrolling parallel across to said P rows includes means for accessing a first row containing the samples that constitute the line of video signal from said first frame corresponding in position to the line of video signal from said frame currently being supplied by said source, and means for channeling said samples from said first row to one of said output ports in time synchronization with the corresponding samples of the current line being supplied by said source.

9. A memory system as set forth in claim 8 further including:

sample processing means responsive to at least one of the signals from said memory output ports and to the signal from said source for providing a filtered replica of one of said signals.

10. A memory system as set forth in claim 9 wherein said sample processing means includes means for algebraically combining samples from said input port with samples from at least said one of said output ports for providing digitized samples representing frame comb filtered chrominance and luminance signals.

11. In a television receiver for displaying images in progressive scan by repeated display of each frame in response to received interlaced scan television signals having first and second line-interlaced fields in each frame, said television receiver including a source of samples of said interlaced scan video signals, and further apparatus comprising:

a scan converter responsive to said samples of interlaced scan video signals for time compressing said samples to half a line duration and producing output samples at doubled normal picture element sampling rate;

a memory comprising:
an input port coupled to said scan converter;
at least one output port;
an array of storage locations addressed by rows and by columns, having a sufficient number of rows to contain at any time M active lines in the final portion of a first frame of said raster scanned video signal and N active lines in the initial portion of a second frame, where M and N sum to a value not less than the number of active lines in one frame, said columns of said array of storage locations being arranged such that successive ones of said columns correspond to successive picture element samples in each line of said raster scanned video signal; and wherein said rows are interleaved to provide parallel access to a plurality of rows;

means for writing lines of said time compressed samples from said first field into a first set of alternate rows of said memory and for writing the samples of the lines of said second field into a second set of intervening alternate rows of said memory;

means for reading lines of samples at a doubled interlaced scan rate, from the rows of said memory to said output port, said means for reading being synchronized to the line advance rate of said raster scanned video signals;

multiplexing means for selecting time compressed samples as output signal, selecting them from said scan converter during the interval that the first set of alternate lines of said first field of each frame is supplied and otherwise from said memory output port, wherein successive selected lines of samples correspond to successive lines in a raster scanned image frame.

12. Apparatus set forth in claim 11 wherein said scan converter includes a first and a second shift register, each of said registers including a cascade of connected delay stages sufficient in number to store the samples descriptive of one line of picture elements, said first register being arranged to be serially loaded at conventional interlace scan rate from said source of samples and to be parallelly unloaded during line retrace, and said second register being arranged to be parallelly loaded during line retrace from said first register and to be serially unloaded at a rate twice said conventional interlace scan rate during the time said first register is being serially loaded.

13. A method for converting raster-scanned television signals with line-interlaced alternate fields to a double-shuttered progressively-scanned television signal, said method comprising the steps of:

sequentially addressing rows of a frame store memory having a number of rows at least as great as the number of active lines in two successive fields of said raster scanned television signal, addressing said rows at least one at a time at twice the line scan rate of said raster-scanned television signal with line-interlaced alternate fields;

scan converting said raster-scanned television signal with line-interlaced alternate fields to compress each scan line duration by half to provide a line-time-compressed television signal;

writing each successive active line of said raster-scanned television signal with line-interlaced alternate fields into a specified one of the sequentially addressed rows of said frame store memory;

reading from said sequentially addressed rows of said frame store memory to provide said progressively scanned television signal during the earlier ones of the line-interlaced fields in each of a succession of pairs of fields;

interleaving in time, to provide said progressively scanned television signal during the later ones of the line-interlaced fields in each of said succession of pairs of fields successive lines of said line-time-compressed television signal and alternate lines of television signal provided by reading said alternate lines of television signal from sequentially addressed rows of said frame store memory.

14. An apparatus for storage and transversal filtering of video signals comprising:

a source of sampled lines of raster scanned video signals;

a memory comprising:
an input port coupled to said sample supplying means;
a data bus;
a plurality of output ports P in number;
an array of storage locations addressed by rows and by columns, having a sufficient number of rows to contain at any time M active lines in the final portion of a first frame of said raster scanned video signal and N active lines in the initial portion of a second frame, where M and N sum to a value greater than the number of active lines in one frame, said columns of said array of storage locations being arranged such that successive ones of said columns correspond to successive picture element samples in each line of said raster scanned video signal; and wherein said rows are interleaved to provide parallel access to at least P rows;

means for parallelly accessing at least P of said rows including: means for reading each of said parallelly accessed rows at a respectively different one of said output ports; means, coupled to said input port, for writing a first line of samples into a first one of said parallelly accessed rows; and means, coupled to said data bus, for writing a second line of samples into a second one of said parallelly accessed rows;

means for scrolling access to said parallelly accessed rows with a row advance rate synchronized to the line advance rate of said raster scanned video signals;

means for combining the samples from said output ports to provide samples of a first transversally filtered output signal; and means for providing the samples of said first transversally filtered output signal to said data bus.

15. The apparatus set forth in claim 14 further including means for operating said array of storage locations as an interleaved memory including:

P memory modules, numbered 0 through P−1, each module being coupled to said input port and to said data bus and to a respectively different one of said P output ports, the rows of said modules being arranged so that successive lines supplied to said first input port are written into modules with successively greater numbers, modulo P; wherein each of said P modules comprises a number Q of submodules, numbered 0 through Q−1, the columns of said submodules being arranged so that successive samples of a line are written into submodules with successively greater numbers, modulo Q.

16. The apparatus set forth in claim 15 wherein said memory includes a means for parallelly accessing a plurality of rows comprising:

an address input port;

a controller coupled to said address input port including:

means for generating P read address and P read control signals, each of said read addresses being paired with a respectively different one of said read control signals for application to a respectively different one of said P memory modules for controlling the parallel reading of samples from the P rows of said memory; and means for generating first and second write address and write control signal pairs for application to respectively different ones of said P memory modules for controlling the parallel writing of said samples applied to said input port and said data bus respectively.

17. Apparatus set forth in claim 16 wherein said means for scrolling parallel access to said memory comprises:

a system enabling means coupled to said sample supplying means for providing an output signal having one value during the time that active lines of a frame are being received and another value during the vertical blanking interval;

a row enabling means, coupled to said sample supplying means for providing an output signal having one value during the time that picture information of a line is being received and another value during the horizontal blanking interval;

field detecting means, responsive to the output signal of said system enabling means and said row enabling means for providing an output signal having one value after an odd field has been received and another value after an even field has been received;

clock generating means coupled to said sample supplying means for providing a digital clock signal synchronized to the rate at which said samples are provided by said sample supplying means;

a column counter responsive to said digital clock signal and to said output signal of said row enabling means for providing a column address, said counter being reset to a predetermined value in response to the output signal of said column enabling means during the horizontal blanking interval;

a row counter for providing a row address, said row counter being incremented by an even value, by a first odd value, and by a second odd value in response to the output signals of said column enabling means, said field detecting means, and said row enabling means.

18. A memory system for the storage of sampled video signals comprising:

a source of sampled lines of raster scanned video signals;

an array of storage location each row of which includes a sufficient number of storage locations to contain the active portion of a line of sampled video signals and the rows of said array being sufficient in number to contain more lines of samples than are needed to hold the active lines of a field of raster scanned video signals;

means for accessing a plurality of said rows for simultaneously reading at least a first line of sampled video signals from said array and for writing at least a second line of sampled video signals into said array;

means for changing the addresses used by said accessing means in synchronization with the line and field advance rates of said source for writing corresponding lines of samples from successive fields into rows with successively smaller address values, modulo N, N being an integer greater than the number of active lines in a frame but not greater than the number of rows of the array.

* * * * *